United States Patent [19]

Takahashi et al.

[11] Patent Number: 4,992,403

[45] Date of Patent: * Feb. 12, 1991

[54] CATALYSTS FOR HYDROTREATING HYDROCARBONS AND METHODS OF PREPARING THE SAME

[75] Inventors: Yasuhito Takahashi, Narashino; Tomio Kawaguchi, Funabashi; Shigeru Sakai, Ichikawa, all of Japan

[73] Assignee: Sumitomo Metal Mining Company Limited, Tokyo, Japan

[ * ] Notice: The portion of the term of this patent subsequent to Jul. 4, 2006 has been disclaimed.

[21] Appl. No.: 394,560

[22] Filed: Aug. 16, 1989

[30] Foreign Application Priority Data

Aug. 19, 1988 [JP]  Japan ............................. 63-206194
Sep. 8, 1988 [JP]  Japan ............................. 63-225099
Sep. 13, 1988 [JP]  Japan ............................. 63-229246
Sep. 13, 1988 [JP]  Japan ............................. 63-229247
Sep. 19, 1988 [JP]  Japan ............................. 63-234000

[51] Int. Cl.$^5$ .......................... B01J 27/49; B01J 21/51
[52] U.S. Cl. .................................. 502/164; 502/162; 502/167; 502/168; 502/210; 502/211; 502/213; 502/219; 502/220; 502/221
[58] Field of Search ............... 502/162, 164, 167, 168, 502/210, 211, 213, 219, 220, 221

[56] References Cited

U.S. PATENT DOCUMENTS 4,845,068  7/1989  Takahashi et al. .................. 502/168

*Primary Examiner*—Patrick P. Garvin
*Attorney, Agent, or Firm*—Watson, Cole, Grindle & Watson

[57] ABSTRACT

Catalysts for hydrotreating hydrocarbons are composed of a carrier substance consisting essentially of an oxide of aluminum and/or an oxide hydrate of aluminum, at least one compound selected from water-soluble compounds of metals of Group VI and Group VIII of the Periodic Table and at least one organic compound selected from mercapto-carboxylic acids of formula $HS-(CH_2)_n-COOR$ (where n is 1 to 3; R is H, alkali metal, alkaline earth metal or ammonium group or alkyl group with 1-10 carbons), thio-acids of formula $R'-COSH$ (where $R'$ is monovalent hydrocarbon with 1-15 carbons), amino-substituted mercaptans of formula $H_2N-R''-SH$ ($R''$ is divalent hydrocarbon with 1-15 carbons), dimercaptans of formula $HS-R''-SH$ ($R''$ is same as above) and mercapto-alcohols of formula $(R^a-S-R'''-(OH)_n$ (where $R'''$ is hydrocarbon with 1-15 carbons; $R^a$ is H or alkyl group with 1-2 carbons; and n is 1-2), and optionally phosphoric acid. The catalysts require neither presulfurization nor heat-treatment and can be directly applied to hydrotreating hydrocarbons.

49 Claims, No Drawings

CATALYSTS FOR HYDROTREATING HYDROCARBONS AND METHODS OF PREPARING THE SAME

FIELD OF THE INVENTION

The present invention relates to catalysts for hydrotreating hydrocarbons and to methods of preparing the same.

BACKGROUND OF THE INVENTION

In the so-called hydrotreating of hydrocarbons, wherein a hydrocarbon oil is hydrogenated, desulfurized, denitrogenated or decomposed in the presence of hydrogen, a catalyst composed of at least one metal selected from the metals of Group VI of the Periodic Table and the metals of Group VIII of the Periodic Table (the active component), such metals being carried on an inorganic oxide carrier such as alumina ($Al_2O_3$), silica-alumina ($SiO_2$-$Al_2O_3$), titania ($TiO_2$) or the like, is employed. As the Group VI metal, molybdenum (Mo) and tungsten (W) are well utilized for the purpose, and as the Group VIII metal, cobalt (Co) and nickel (Ni) can be used.

Such a metal is generally carried on the carrier in the form of an oxide thereof, which, however, is an inactive compound. Accordingly, the catalyst must be activated by presulfurization so as to convert the metal oxide into the corresponding sulfide prior to being used in the hydrotreating reaction.

In a conventional technique for such presulfurization, a sulfurizing agent is introduced into the catalyst layer, together with hydrogen, after the catalyst has been filled in a reactor where hydrotreating a hydrocarbon oil is to be effected. The operating conditions for presulfurization vary in accordance with the hydrotreating process and with the sulfurizing agent used. For instance, where hydrogen sulfide is used as the sulfurizing agent, the compound is incorporated into hydrogen in an amount of from 0.5 to 5% by volume or so, and the hydrogen sulfide-containing hydrogen is applied to the catalyst in an amount of from 1000 to 3000 liters per liter of the catalyst (as calculated under the conditions of normal temperature and normal pressure) and the presulfurization is effected at 180° C. or higher (generally 250° C. or higher). Where carbon disulfide, normalbutyl mercaptan, dimethyl sulfide, demethyl disulfide or the like is used as the sulfurizing agent, the compound is diluted with a light hydrocarbon oil and is applied to the catalyst at a temperature of from 250° C. to 350° C., a pressure of from 20 to 100 $kg/cm^2$, a liquid space velocity of from 0.5 to 2.0 $hr^{-1}$, and a hydrogen/oil ratio of from 200 to 1000 N-liter/liter.

After completion of such presulfurization, the reaction system is substituted by a raw material oil which is actually to be processed and the intended hydrotreatment is started with the thus-activated catalyst. As the presulfurization has a significant influence on the success of the hydrotreatment to follow, pertinent selection of the materials to be employed in the process and careful operation of the process are required. Where a diluting agent is used, for instance, the agent must be a hydrocarbon oil free from olefins since olefins, if contained in the diluting agent, will form a polymer product and the product will poison the hydrotreating catalyst. The catalyst metal would be passivated when reacted at a high temperature with hydrogen to be reduced. Accordingly, in order to prevent such passivation, it is necessary to use an excess amount of the sulfurizing agent, and the proportion of the sulfurizing agent and hydrogen must be maintained properly. Further, although such presulfurization is generally carried out for several days, it is not automated in most cases as the operation is a temporary one. In addition, the presulfurization process requires some complicated treatment steps which are different from the conventional ones; thus, the process is labour intensive. For this reason, omission of the pre-sulfurization step or at least a reduction in the complexity of the presulfurization steps has been a desired goal in this technical field.

Recently, one method has been proposed which could meet the goal. This method is directed to presulfurization of an active metal-carried catalyst by impregnating the catalyst with a polysulfide of a general formula R-S(n)-R', where n represents an integer of from 3 to 20, and R and R' each represent a hydrogen atom or an organic group having from 1 to 150 carbon atoms per one molecule, and heat-treating the thus-impregnated catalyst at a temperature of 65° to 275° C. and a pressure of 0.5 to 70 bars and in the absence of hydrogen gas (Japanese Patent Application Laid-Open No. 61-111144).

In accordance with this method, the polysulfide as introduced into the catalyst sulfurizes the active metal by heat-treatment. Accordingly, where the above-mentioned presulfurization is carried out in a reactor, neither a sulfurizing agent nor a diluting agent is necessary and the operation is easy. In addition, the above-mentioned pre-sulfurization may also be effected even outside the reactor. In such a case, the presulfurized catalyst may be applied to the reactor, whereupon the intended hydrotreatment may immediately be started.

However, the amount of polysulfide used in the method is a stoichiometrical amount necessary for sulfurizing the whole active metal oxide (for example, CoO, $MnO_3$) in the catalyst by the successive heat-treatment thereof, and the polysulfide is diluted in a pertinent organic solvent and then applied to the catalyst for impregnation. Since the polysulfide is highly viscous, the viscosity would still be high even though it is diluted with an organic solvent and, as a result, there would be a problem that the polysulfide would hardly penetrate into the inside of fine pores of the catalyst.

The catalyst to be treated by presulfurization is prepared by a method where an aluminium hydrate obtained from a starting material of sodium aluminate is shaped, dried and fired to give a γ-alumina, and the resulting γ-alumina is impregnated with an aqueous solution of a water-soluble compound of an active metal and then dried and heat-treated so that the active metal is converted into the corresponding oxide form, or by a method where an aluminium hydrate is blended with an aqueous solution of a water-soluble compound of an active metal and then shaped, dried and fired so that the active metal is carried on a carrier composed of the resulting γ-alumina in the form of the oxide form of the active metal.

SUMMARY OF THE INVENTION

The object of the present invention is to provide catalysts for hydrotreating of hydrocarbons which can be prepared more simply and more inexpensively than the above-mentioned conventional methods, which can be employed in hydrotreatment without pre-sulfurization, and which can be directly applied to hydrotreatment without heat treatment, as well as to provide methods for preparing such catalysts.

The present inventors have found that the object may be attained by employing a water-soluble compound of a metal of Group VI and Group VIII of the Periodic Table as the active ingredient together with employment of an organic compound having one or two sulfurs in place of polysulfides and further employing phosphoric acid.

Specifically, the subject matter of the present invention is to provide a catalyst for hydrotreating of hydrocarbons which is composed of a carrier substance consisting essentially of an oxide of aluminium and/or an oxide hydrate of aluminium, at least one compound selected from water-soluble compounds of metals of Group VI and Group VIII of the Periodic Table and at least one organic compound selected from the group consisting of mercaptocarboxylic acids of a general formula:

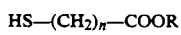
HS—(CH$_2$)$_n$—COOR where n represents an integer of from 1 to 3; and R represents a hydrogen atom, or an alkali metal, an alkaline earth metal, an ammonium group, or an alkyl group having from 1 to 10 carbon atoms, thio-acids of a general formula:

R'—COSH where R' represents a monovalent hydrocarbon group having from 1 to 15 carbon atoms, amino-substituted mercaptans of a general formula:

H$_2$N—R''—SH where R'' represents a divalent hydrocarbon group having from 1 to 5 carbon atoms, dimercaptans of a general formula:

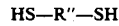
HS—R''—SH where R'' represents a divalent hydrocarbon group having from 1 to 5 carbon atoms, and mercapto-alcohols of a general formula:

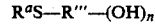
R$^a$S—R'''—(OH)$_n$ where R''' represents a hydrocarbon group having from 1 to 15 carbon atoms; R$^a$ represents a hydrogen atom or an alkyl group having from 1 to 2 carbon atoms; and n represents an integer of from 1 to 2.

In accordance with the first embodiment of the present invention, the catalyst of the present invention is prepared by a method where a carrier substance consisting essentially of an oxide of aluminium and/or an oxide hydrate of aluminium is blended and kneaded with a solution containing at least one compound selected from water-soluble compounds of metals of Group VI and Group VIII of the Periodic Table and at least one organic compound selected from the group consisting of mercaptocarboxylic acids of a general formula:

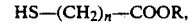
HS—(CH$_2$)$_n$—COOR, thio-acids of a general formula:

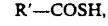
R'—COSH, amino-substituted mercaptans of a general formula:

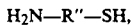
H$_2$N—R''—SH, dimercaptans of a general formula:

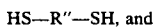
HS—R''—SH, and mercapto-alcohols of a general formula:

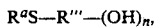
R$^a$S—R'''—(OH)$_n$, and the resulting blend is shaped and dried to prepare the catalyst. (In the noted formulae, n, R, R', R'', R''' and R$^a$ have the same meanings as mentioned above, and the same shall apply hereunder.)

In accordance with the second embodiment of the present invention, the catalyst of the present invention is prepared by a method where a carrier substance consisting essentially of an oxide of aluminium and/or an oxide hydrate of aluminium is blended and kneaded with an aqueous solution of at least one compound selected from water-soluble compounds of metals of Group VI and Group VIII of the Periodic Table, the resulting blend is shaped and then temporarily dried, and the thus-dried and shaped body is impregnated with a solution of at least one organic compound selected from the group consisting of mercaptocarboxylic acids of a general formula:

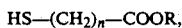
HS—(CH$_2$)$_n$—COOR, thio-acids of a general formula:

R'—COSH, amino-substituted mercaptans of a general formula:

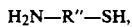
H$_2$N—R''—SH, dimercaptans of a general formula:

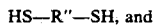
HS—R''—SH, and mercapto-alcohols of a general formula:

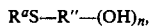
R$^a$S—R''—(OH)$_n$, and then again dried to prepare the catalyst.

In accordance with the third object of the present invention, the catalyst of the present invention is prepared by a method where a carrier substance consisting essentially of an oxide of aluminium and/or an oxide hydrate of aluminium is blended and kneaded with an aqueous solution of at least one organic compound selected from the group consisting of mercaptocarboxylic acids of a general formula:

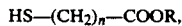
HS—(CH$_2$)$_n$—COOR, thio-acids of a general formula:

R'—COSH, amino-substituted mercaptans of a general formula:

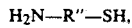
H$_2$N—R''—SH, dimercaptans of a general formula:

HS—R"—SH, and mercapto-alcohols of a general formula:

$$R^aS—R"'—(OH)_n,$$

the resulting blend is shaped and then temporarily dried, and the thus-dried and shaped body is impregnated with an aqueous solution of at least one compound selected from water-soluble compounds of metals of Group VI and Group VIII of the Periodic Table, and then again dried to prepare the catalyst.

In accordance with the fourth object of the present invention, there is provided a catalyst for hydrotreating hydrocarbons, which comprises a shaped body of a mixture composed of a carrier substance consisting essentially of an oxide of aluminium and/or an oxide hydrate of aluminium, at least one compound selected from water-soluble compounds of metals of Group VI and Group VIII of the Periodic Table, a phosphoric acid, and at least one organic compound selected from the group consisting of mercapto-carboxylic acids of a general formula:

$$HS—(CH_2)_n—COOR,$$

thio-acids of a general formula $$R'—COSH,$$

amino-substituted mercaptans of a general formula:

$$H_2N—R"'—SH,$$

dimercaptans of a general formula:

$$HS—R"—SH, and$$

mercapto-alcohols of a general formula:

$$R^aS—R"'—(OH)_n.$$

In accordance with the fifth embodiment of the present invention, the catalyst of the fourth embodiment of the present invention is prepared by a method where a carrier substance consisting essentially of an oxide of aluminium and/or an oxide hydrate of aluminium is blended and kneaded with a solution containing at least one compound selected from water-soluble compounds of metals of Group VI and Group VIII of the Periodic Table, phosphoric acid and at least one organic compound selected from the group consisting of mercapto-carboxylic acids of a general formula:

$$HS—(CH_2)_n—COOR,$$

thio-acids of a general formula:

$$R'—COSH,$$

amino-substituted mercaptans of a general formula:

$$H_2N—R"'—SH,$$

dimercaptans of a general formula:

$$HS—R"—SH, and$$

mercapto-alcohols of a general formula:

$$R^aS—R"'—(OH)_n,$$

and the resulting blend is shaped and dried to prepare the catalyst of the fourth embodiment of the present invention.

In accordance with the sixth embodiment of the present invention, the catalyst of the fourth embodiment of the present invention is prepared by a method where a carrier substance consisting essentially of an oxide of aluminium and/or an oxide hydrate of aluminium is blended and kneaded with an aqueous solution comprising at least one compound selected from water-soluble compounds of metals of Group VI and Group VIII of the Periodic Table and phosphoric acid, the resulting blend is shaped and then temporarily dried, and the thus-dried and shaped body is impregnated with a solution of at least one organic compound selected from the group consisting of mercapto-carboxylic acids of a general formula:

$$HS—(CH_2)_n—COOR,$$

thio-acids of a general formula:

$$R'—COSH,$$

amino-substituted mercaptans of a general formula:

$$H_2N—R"—SH,$$

dimercaptans of a general formula:

$$HS—R"—SH, and$$

mercapto-alcohols of a general formula:

$$R^aS—R"'—(OH)_n,$$

and then again dried to prepare the catalyst of the fourth embodiment of the present invention.

In accordance with the seventh embodiment of the present invention, the catalyst of the fourth embodiment of the present invention is prepared by a method where a carrier substance consisting essentially of an oxide of aluminium and/or an oxide hydrate of aluminium is blended and kneaded with a solution comprising at least one compound selected from water-soluble compounds of metals of Group VI and Group VIII of the Periodic Table and at least one organic compound selected from the group consisting of mercapto-carboxylic acids of a general formula:

$$HS—(CH_2)_n—COOR,$$

thio-acids of a general formula:

$$R'—COSH,$$

amino-substituted mercaptans of a general formula:

$$H_2N—R"—SH,$$

dimercaptans of a general formula:

$$HS—R"—SH, and$$

mercapto-alcohols of a general formula:

$$R^aS—R"'—(OH)_n,$$

the resulting blend is shaped and then temporarily dried, and the thus-dried and shaped body is impregnated with an aqueous solution of phosphoric acid and then again dried to prepare the catalyst of the fourth embodiment of the present invention.

In accordance with the eighth embodiment of the present invention, the catalyst of the fourth embodiment of the present invention is prepared by a method where a carrier substance consisting essentially of an oxide of aluminium and/or an oxide hydrate of aluminium is blended and kneaded with a solution containing phosphoric acid and at least one organic compound selected from the group consisting of mercapto-carboxylic acids of a general formula:

HS—(CH$_2$)$_n$—COOR, thio-acids of a general formula:

R'—COSH, amino-substituted mercaptans of a general formula:

H$_2$N—R''—SH, dimercaptans of a general formula:

HS—R''—SH, and mercapto-alcohols of a general formula:

R$^a$S—R'''—(OH)$_n$, the resulting blend is shaped and then temporarily dried, and the thus-dried and shaped body is impregnated with an aqueous solution of at least one compound selected from water-soluble compounds of metals of Group VI and Group VIII of the Periodic Table and then again dried to prepare the catalyst of the fourth embodiment of the present invention.

In accordance with the ninth embodiment of the present invention, the catalyst of the fourth embodiment of the present invention is prepared by a method where a carrier substance consisting essentially of an oxide of aluminium and/or an oxide hydrate of aluminium is blended and kneaded with an aqueous solution of at least one compound selected from water-soluble compounds of metals of Group VI and Group VIII of the Periodic Table, the resulting blend is shaped and then temporarily dried, and the thus-dried and shaped body is impregnated with a solution containing phosphoric acid and at least one organic compound selected from the group consisting of mercapto-carboxylic acids of a general formula:

HS—(CH$_2$)$_n$—COOR, thio-acids of a general formula:

R'—COSH, amino-substituted mercaptans of a general formula:

H$_2$N—R''—SH, dimercaptans of a general formula:

HS—R''—SH, and mercapto-alcohols of a general formula:

R$^a$S—R'''—(OH)$_n$, and then again dried to prepare the catalyst of the fourth embodiment of the present invention.

In accordance with the tenth embodiment of the present invention, the catalyst of the fourth embodiment of the present invention is prepared by a method where a carrier substance consisting essentially of an oxide of aluminium and/or an oxide hydrate of aluminium is blended and kneaded with a solution of at least one organic compound selected from the group consisting of mercapto-carboxylic acids of a general formula:

HS—(CH$_2$)$_n$—COOR, thio-acids of a general formula:

R'—COSH, amino-substituted mercaptans of a general formula:

H$_2$N—R''—SH, dimercaptans of a general formula:

HS—R''—SH, and mercapto-alcohols of a general formula:

R$^a$S—R'''—(OH)$_n$, the resulting blend is shaped and then temporarily dried, and the thus-dried and shaped body is impregnated with an aqueous solution containing at least one compound selected from water-soluble compounds of metals of Group VI and Group VIII of the Periodic Table and phosphoric acid, and then again dried to prepare the catalyst of the fourth embodiment of the present invention.

In accordance with the eleventh embodiment of the present invention, the catalyst of the fourth embodiment of the present invention is prepared by a method where a carrier substance consisting essentially of an oxide of aluminium and/or an oxide hydrate of aluminium is blended and kneaded with an aqueous solution of phosphoric acid, the resulting blend is shaped and then temporarily dried, and the thus-dried and shaped body is impregnated with a solution containing comprising at least one compound selected from water-soluble compounds of metals of Group VI and Group VIII of the Periodic Table and at least one organic compound selected from the group consisting of mercapto-carboxylic acids of a general formula:

HS—(CH$_2$)$_n$—COOR, thio-acids of a general formula:

R'—COSH, amino-substituted mercaptans of a general formula:

H$_2$N—R''—SH, dimercaptans of a general formula:

HS—R''—SH, and mercapto-alcohols of a general formula:

$$R^a\text{—}S\text{—}R'''\text{—}(OH)_n,$$

and then again dried to prepare the catalyst of the fourth embodiment of the present invention.

DETAILED DESCRIPTION OF THE INVENTION

As the carrier substance for use in the present invention, which consists essentially of an oxide of aluminium and/or an oxide hydrate of aluminium, a γ-alumina or boehmite obtainable by heat-treating a hydrate of aluminium is employed. Boehmite has a structural formula of AlO(OH) or a chemical formula of $Al_2O_3 \cdot H_2O$ as monohydrate of alumina), which is an aluminium oxide hydrate. Sodium aluminate is hydrolyzed to give a gel substance, and this is dehydrated by filter-pressing to prepare a dehydrated boehmite gel (hereinafter referred to as "dehydrated boehmite"); or the dehydrated boehmite is spray-dried (hereinafter referred to as "spray-dried boehmite"). Both dehydrated boehmite and spray-dried boehmite can be employed in the present invention. Boehmite is also prepared as a natural boehmite ore, which contains impurities of $SiO_2$, $FeO_2$, $Fe_2O_3$, MgO, CaO, etc. When heated, boehmite is dehydrated to γ-alumina, to δ-alumina and to θ-alumina in order, and this finally becomes α-alumina (corundum) at 1100° to 1200° C. Accordingly, as boehmite is an intermediate between aluminium hydroxide and aluminium oxide, it may be employed singly or it may also be employed in combination with an active γ-alumina. Alternatively, only γ-alumina may also be employed as the carrier substance. In addition, silica or titania may be blended with the noted compound and the resulting mixture may also be used as the carrier substance.

As the water-soluble compounds of metals of Group VI of the Periodic Table for use in the present invention, molybdenum (Mo) and tungsten (W) which are generally employed as active metals of catalysts are preferably employed in the form of ammonium molybdate and ammonium tungstate, respectively. Where molybdenum trioxide and tungsten trioxide are employed, ammonia gas is applied thereto and they are used in the form of ammonium molybdate and ammonium tungstate. As the water-soluble compounds of metals of Group VIII of the Periodic Table for use in the present invention, cobalt (Co) and nickel (Ni) which are generally employed as active metals of catalysts are preferably employed in the form of cobalt nitrate, cobalt carbonate, nickel nitrate and nickel carbonate. They are used singly or in combination, in the form of an aqueous solution. Where the water-soluble compounds of the active metals are heated together with at least one of mercapto-carboxylic acids of a general formula $HS\text{—}(CH_2)_n\text{—}COOR$, thio-acids of a general formula $R'\text{—}COSH$, amino-substituted mercaptans of a general formula $H_2N\text{—}R'\text{—}SH$, dimercaptans of a general formula $HS\text{—}R''\text{—}SH$ and mercapto-alcohols of a general formula $R^aS\text{—}R'''\text{—}(OH)_n$ (hereinafter referred to as "mercapto-carboxylic acids and other sulfurizing agents"), they form sulfides such as $MoS_2$, $WS_2$, CoS, NiS and the like which are highly active in hydrogenation reactions.

In the mercapto-carboxylic acids and other sulfurizing agents for use in the present invention, the portion which is functional to sulfurization of active metals comprises one or two sulfur components in the molecule of the respective sulfurizing agent compounds.

Accordingly, where the number of the carbon atoms in the hydrocarbon group in the molecule of the sulfurizing agent compound is large, the portion which is functional as the sulfurizing agent in the molecule would thereby be relatively small and, as a result, not only the compound is uneconomical, but also the compound would unfavorably bring superfluous carbons and hydrogens into the catalyst. Because of this, the sulfurizing compounds to be employed in the present invention are preferred to have as few carbon atoms as possible. Specifically, the number of carbon atoms in the compounds is preferably at most 15. More precisely, as the mercapto-carboxylic acids of a general formula $HS\text{—}(CH_2)_n\text{—}COOR$ (where n represents an integer of from 1 to 3; and R represents a hydrogen atom, or an alkali metal, an alkaline earth metal, an ammonium group, or an alkyl group having from 1 to 10 carbon atoms), for example, mercaptoacetic acid ($HSCH_2COOH$), β-mercapto-propionic acid ($HSCH_2CH_2COOH$) or the like mercapto-carboxylic acids, as well as alkali metal salts, alkaline earth metal salts and ammonium salts thereof can be employed. In particular, metal ion-free acid-type and ammonium salt-type compounds which do not form any substances that would poison the catalyst for hydrogenation reaction are preferred. These can be used also together with phosphoric acid in the form of a phosphoric acid-containing acidic aqueous solution. In addition, there are also mentioned mercaptocarboxylic acid esters such as methyl mercapto-acetate ($HSCH_2COOCH_3$), ethyl 2-mercapto-acetate ($HSCH_2COOC_2H_5$), 2-ethylhexyl mercapto-acetate ($HSCH_2COOC_8H_{17}$) or methyl 3-mercaptopropionate ($HSCH_2CH_{22}COOCH_3$). As the thio-acids of a general formula $R'\text{—}COSH$ (where $R'$ represents a hydrocarbon group having from 1 to 15 carbon atoms), there are mentioned, for example, thio-acetic acid ($CH_3COSH$) and thio-benzoic acid ($C_6H_5COSH$). As the amino-substituted mercaptans of a general formula $H_2N\text{—}R''\text{—}SH$ (where $R''$ represents a divalent hydrocarbon group), for example, there are mentioned 2-aminoethane-thiol ($H_2NCH_2CH_2SH$) and 4-aminothiophenol ($H_2NC_6H_4SH$). As the dimercaptans of a general formula $HS\text{—}R''\text{—}SH$ (where $R''$ represents a divalent hydrocarbon group having from 1 to 15 carbon atoms, for example, there are mentioned ethanedithiol ($HSCH_2CH_2SH$) and 1,4-butanedithiol ($HS(CH_2)_4SH$). As the mercapto-alcohols of a general formula $R^a\text{—}S\text{—}R'''\text{—}(OH)_n$ (where $R'''$ represents an alkyl group having from 1 to 15 carbon atoms or a phenyl group; $R^a$ represents a hydrogen atom or an alkyl group having from 1 to 2 carbon atoms; and n represents an integer of from 1 to 2), for example, there are mentioned 2-mercaptoethanol ($HSCH_2CH_2OH$), 2-(methylthio)ethanol ($CH_3SCH_2CH_2OH$), 2-(ethylthio)ethanol ($C_2H_5SCH_2CH_2OH$), 3-mercapto-2-butanol ($CH_3CH(SH)CH(OH)CH_3$), 4-mercaptophenol ($HSC_6H_4OH$), 2-(methylthio)phenol ($CH_3SC_6H_4OH$), 4-(methylthio)-phenol ($CH_3SC_6H_4OH$), 2-ethylthio)-phenol ($C_2H_5SC_6H_4OH$), 3-mercapto-1,2-propanediol ($HSCH_2CH(OH)CH_2OH$), 3-methylthio-1,2-propanediol ($CH_3SCH_2CH(OH)CH_2OH$) and 3-ethylthio-1,2-propanediol ($C_2H_5SCH(OH)CH_2OH$). The noted examples of the compounds are preferably employed in the present invention but do not whatsoever restrict the scope of the present invention.

Regarding the content of the metals of Group VI and Group VIII of the Periodic Table in the catalyst as the active metal component therein, where the catalyst contains only one kind of the active metals, the content of the metal in the catalyst is preferred to fall within the range of from 1 to 30% by weight as the oxide of the active metal. On the other hand, where the catalyst contains both the metal of Group VI and the metal of Group VIII in combination, it is preferred that the content of the metal of Group VI is from 5 to 30% by weight and that of the metal of Group VIII is from 1 to 8% by weight, both as oxides of the metals.

The amount of the mercapto-carboxylic acids and other sulfurizing agents to be used in accordance with the present invention is preferably from 1 to 3 equivalents to the sulfur amount necessary for forming sulfides, which are highly active in hydrogenation reaction, such as $MoS_2$, $WS_2$, $CoS$ or $NiS$, from the metals of Group VI and Group VIII of the Periodic Table. If the amount is less than one equivalent, a sufficient activity cannot be attained. On the other hand, if it is more than three equivalents, the activity is not enhanced. Accordingly, the amount falling within the noted range is best.

Phosphoric acid may be incorporated into the catalyst in an amount of about 3% by weight as $P_2O_5$.

The catalyst of the present invention can be prepared from the above-mentioned raw materials in the proportion as mentioned above, in accordance with the methods mentioned below. In the first method, the carrier substance, the active metal and the sulfurizing agent are kneaded, shaped and dried (Method I). In the second method, the carrier substance and the active metal are blended, shaped and dried, and the dried and shaped body is impregnated with the sulfurizing agent solution and re-dried (Method II). In the third method, the carrier substance and the sulfurizing agent are kneaded, shaped and dried, and the dried and shaped body is impregnated with the active metal solution and re-dried (Method III). In the fourth method, the carrier substance, the active metal, phosphoric acid and the sulfurizing agent are kneaded, shaped and dried (Method IV). In the fifth method, the carrier substance, the active metal and phosphoric acid are kneaded, shaped and dried, and the dried and shaped body is impregnated with the sulfurizing agent solution and re-dried (Method V). In the sixth method, the carrier substance, the active metal and the sulfurizing agent are kneaded, shaped and dried, and the dried and shaped body is impregnated with phosphoric acid solution and re-dried (Method VI). In the seventh method, the carrier substance, phosphoric acid and the sulfurizing agent are kneaded, shaped and dried, the dried and shaped body is impregnated with the active metal solution and re-dried (Method VII). In the eighth method, the carrier substance and the active metal are kneaded, shaped and dried, and the dried and shaped body is impregnated with a solution containing phosphoric acid and the sulfurizing agent and then re-dried (Method VIII). In the ninth method, the carrier substance and the sulfurizing agent are kneaded, shaped and dried, and the dried and shaped body is impregnated with a solution containing the active metal and phosphoric acid and then re-dried (Method IX). In the tenth method, the carrier substance and phosphoric acid are kneaded, shaped and dried, and the dried and shaped body is impregnated with a solution containing the active metal and the sulfurizing agent and then re-dried (Method X).

As the solvent for dissolving the water-soluble compounds and sulfides of the active metals, water is most economically employed.

The drying temperature in the methods preferably falls within the range of from 50° to 200° C.; and the drying time therein preferably falls within the range of from 2 to 20 hours.

For practical use of the catalysts as prepared by the methods of the present invention, the freshly dried catalyst may be filled in a reactor column and can be utilized for hydrotreating a hydrocarbon oil in the column. The water content in the catalyst as introduced thereinto in the course of the step of preparing the catalyst may be dried and removed therefrom after the catalyst has been put in the reactor column.

Since the catalyst of the present invention contains the mercapto-carboxylic acid and other sulfurizing agent in the form as carried on the carrier substance together with the watersoluble compound of the active metal, the active metal can be converted into the sulfide thereof in the course of the step of elevating the temperature of the reaction system up to the reaction temperature for dehydration and desulfurization of the hydrocarbon oil to be processed with the catalyst and, as a result, the catalyst can directly be utilized in the hydrodesulfurization for the hydrocarbon oil without presulfurization of the catalyst.

In addition, the catalysts of the present invention have a higher activity than the conventional catalysts which require presulfurization. Although not clarified as yet, the reason is believed to be that the mercapto-carboxylic acids and other sulfurizing agents form a soluble coordination compound (metal mercaptide) together with the water-soluble compounds of the active metals and the resulting soluble coordinate compound is carried on the carrier substance in a highly dispersed form.

The following examples are intended to illustrate the present invention in more detail but not to limit it in any way.

In the following examples, all the catalysts were shaped by extrusion moulding into a cylindrical shape having a diameter of 1.6 mm and a length of from 3 to 5 mm.

The catalyst activity was evaluated on the basis of hydrodesulfurization of Kuwait straight-run light gas oil (KSRLGO).

The KSRLGO used in the reaction had the following properties:

| Specific Gravity (15/4° C.) | 0.844 |
| Sulfur Content (% by weight) | 1.13 |
| Nitrogen Content (ppm by weight) | 162 |
| Distillation Characteristics: | |
| Initial Boiling Point (°C.) | 203.3 |
| 50 vol. % Point (°C.) | 299.0 |
| End Point (°C.) | 391.8 |

The reaction was effected by the use of a flow method reaction device, under the following reaction conditions.

| Amount of Catalyst | 3 ml |
| Liquid Hourly Space Velocity of Raw Material Oil | 2.0 $hr^{-1}$ |
| Reaction Pressure (hydrogen pressure) | 30 $kg/cm_2$ |
| Reaction Temperature | 330° C. |
| Hydrogen/Oil Ratio | 300 N-liter/liter |

-continued

| Oil-Introducing Time | 8 hr |

The oil being processed was sampled every two hours, and the sulfur content in the oil and the desulfurization percentage were obtained. The desulfurization percentage as mentioned in the following examples indicates an average of the values of the desulfurization percentage as obtained from the sulfur content in the processed oil as sampled four hours, six hours and eight hours after the start of the reaction.

EXAMPLE 1: (Method-I)

211.1 g of 50 wt. % ammonium thioglycolate was added to 300 ml of a solution prepared from 37.0 g of molybdenum trioxide, 15.8 g of cobalt carbonate (Co content: 49.1 wt. %), ammonia gas and water to obtain a metal mercaptide solution (pH 7.0).

The metal mercaptide solution and 272 g of spray-dried boehmite powder ($Al_2O_3$: 73.5 wt. %) were put in a kneader and kneaded to obtain a blend, which was then shaped.

The shaped body was dried at 100° C. for 16 hours to prepare a catalyst (Catalyst-1).

The breaking strength of Catalyst-1 was 1.5 kg/mm or more.

Regarding the active metal content in Catalyst-1, the molybdenum content was 15% by weight as $MoO_3$, and the cobalt content was 4% by weight as CoO. The amount of ammonium thioglycolate was contained 1.5 times the theoretical amount of sulfur necessary to convert Mo and Co into $MoS_2$ and CoS, respectively.

The desulfurization percentage with Catalyst-1 was 84.1%.

EXAMPLE 2: (Method I)

147.4 g of 50 wt. % ammonium thioglycolate solution was added to 300 ml of a solution prepared from 37.0 g of tungsten trioxide, 15.8 g of cobalt carbonate (Co content: 49.1 wt. %), ammonia gas and water to obtain a metal mercaptide solution (pH 7.5).

The metal mercaptide solution and 272 g of the same spray-dried boehmite powder as that used in Example 1 were put in a kneader and kneaded to obtain a blend, which was then shaped.

The shaped body was dried at 100° C. for 16 hours to prepare a catalyst (Catalyst-2).

The breaking strength of Catalyst-2 was 1.5 kg/mm or more.

Regarding the active metal content in Catalyst-2, the tungsten content was 15% by weight as $WO_3$, and the cobalt content was 4% by weight as CoO. The amount of ammonium thioglycolate used contained 1.5 times the theoretical amount of sulfur necessary to convert W and Co in to $WS_2$ and CoS, respectively.

The desulfurization percentage with Catalyst-2 was 83.0%.

EXAMPLE 3: (Method II)

400 ml of an aqueous solution (pH 8.0) was prepared from 37.0 g of molybdenum trioxide, 15.8 g of cobalt carbonate (Co content: 49.1 wt. %), ammonia gas and water.

The solution and 272 g of the same spray-dried boehmite powder as that used in Example 1 were put in a kneader and kneaded to obtain a blend, which was then shaped.

The shaped body was dried for 16 hours at 100° C. Next, the dried body was impregnated with 120 ml of an aqueous solution containing 109.1 g of mercapto-acetic acid and then dried for 16 hours at 100° C. Accordingly, Catalyst-3 was prepared.

The breaking strength of Catalyst-3 was 1.5 kg/mm or more.

Regarding the active metal content in Catalyst-3, the molybdenum content was 15% by weight as $MoO_3$ and the cobalt content was 4% by weight as CoO. The amount of mercapto-acetic acid used contained 1.5 times the theoretical amount of sulfur necessary to convert Mo and Co into $MoS_2$ and CoS, respectively.

The desulfurization percentage with Catalyst-3 was 82.9%.

EXAMPLE 4: (Method III)

272 g of the same spray-dried boehmite powder as that used in Example 1 and 300 ml of an aqueous solution containing 211.1 g of 50 wt. % ammonium thioglycolate were put in a kneader and kneaded to obtain a blend, which was then shaped.

The shaped body was dried at 100° C. for 16 hours. The dried, shaped body was then completely dipped in 150 ml of a solution prepared from 37.0 g of molybdenum trioxide, 15.8 g of cobalt carbonate (Co content: 49.1 wt. %), ammonia gas and water (pH 7.5) and thereafter dried at 100° C. for 16 hours. The noted operation was repeated twice, and accordingly Catalyst-4 was prepared.

The breaking strength of Catalyst-4 was 1.5 kg/mm or more.

Regarding the active metal content of Catalyst-4, the molybdenum content was 15% by weight as $MoN_3$ and the cobalt content was 4% by weight as CoO. The amount of ammonium thioglycolate used contained 1.5 times the theoretical amount of sulfur necessary to convert Mo and Co into $MoS_2$ and CoS, respectively.

The desulfurization percentage with Catalyst-4 was 83.6%.

EXAMPLES 5, 6 AND 7: (Method IV)

72.7 g of mercapto-acetic acid was added to 300 ml of a solution prepared from 38.5 g of molybdenum trioxide, 16.4 g of cobalt carbonate (Co content: 49.1 wt. %), 12.5 g of 85 wt. % phosphoric acid and water to obtain a phosphoric acid-containing metal mercaptide solution (pH 0.6).

The metal mercaptide solution and 673 g of dehydrated boehmite ($Al_2O_3$: 29.7 wt. %) were put in a heating kneader and kneaded with heating at 95° C. so as to evaporate the excess water, to obtain a blend, which was then shaped.

The shaped body was dried at 100° C. for 16 hours to obtain a catalyst (Catalyst-5).

Catalyst-6 and Catalyst-7 were prepared in the same manner as above, except that mercapto-acetic acid was used in an amount of 109.1 g and 145.5 g, respectively.

The breaking strength of Catalysts 5, 6 and 7 was 1.5 kg/mm or more.

Regarding the active metal content in Catalysts 5, 6 and 7, the molybdenum content was 15% by weight as $MoO_3$, the cobalt content was 4% by weight as CoO and the phosphorus content is 3% by weight as $P_2O_5$. The amount of mercapto-acetic acid used contained 1.0 times, 1.5 times and 2.0 times, respectively, the theoretical amount of sulfur necessary to convert Mo and Co into $MoS_2$ and CoS, respectively.

The desulfurization percentage with each of Catalysts 5, 6 and 7 was 82.5%, 83.5% and 82.0%, respectively.

EXAMPLE 8: (Method IV)

109.1 g of mercapto-acetic acid was added to 300 ml of a solution prepared from 38.5 g of molybdenum trioxide, 16.4 g of cobalt carbonate (Co content: 49.1 wt. %), 12.5 g of 85 wt. % phosphoric acid and water, to obtain a phosphoric acid-containing metal mercaptide solution (pH 0.6).

The metal mercaptide solution and 272 g of the same spray-dried boehmite powder as that used in Example 1 were put in a kneader and kneaded to obtain a blend, which was then shaped.

The shaped body was dried at 100° C. for 16 hours to prepare a catalyst (Catalyst-8).

The breaking strength of Catalyst-8 was 1.5 kg/mm or more.

Regarding the active metal content in Catalyst-8, the molybdenum content was 15% by weight as $MoO_3$, the cobalt content was 4% by weight as CoO and the phosphorus content was 3% by weight as $P_2O_5$. The amount of mercapto-acetic acid used contained 1.5 times the theoretical amount of sulfur necessary to convert Mo and Co into $MoS_2$ and CoS, respectively.

The desulfurization percentage with Catalyst-8 was 8.18%.

EXAMPLE 9: (Method IV)

109.1 g of mercapto-acetic acid was added to 300 ml of a solution prepared from 38.5 g of molybdenum trioxide, 16.4 g of cobalt carbonate (Co content: 49.1 wt. %), 12.5 g of 85 wt. % phosphoric acid and water, to obtain a phosphoric acid-containing metal mercaptide solution (pH 0.6).

The metal mercaptide solution and 200 g of $\gamma$-alumina powder were put in a kneader and kneaded to obtain a blend comprising the noted $\gamma$-alumina and metal mercaptide. This was thereafter shaped.

The shaped body was dried at 100° C. for 16 hours to prepare a catalyst (Catalyst-9).

The breaking strength of Catalyst-9 was 1.5 kg/mm or more.

Regarding the active metal content in Catalyst-9, the molybdenum content was 15% by weight as $MoO_3$, the cobalt content was 4% by weight as CoO and the phosphorus content was 3% by weight as $P_2O_5$. The amount of mercapto-acetic acid used contained 1.5 times the theoretical amount of sulfur necessary to convert Mo and Co into $MoS_2$ and CoS, respectively.

The desulfurization percentage with Catalyst-9 was 81.5%.

EXAMPLE 10: (Method IV)

106.8 g of mercapto-propionic acid was added to 300 ml of a solution prepared from 38.5 g of molybdenum trioxide, 16.4 g of cobalt carbonate (Co content: 49.1 wt. %), 12.5 g of 85 wt. % phosphoric acid and water, to obtain a phosphoric acid-containing metal mercaptide solution (pH 0.7).

The metal mercaptide solution and 673 g of the same dehydrated boehmite as that used in Examples 5, 6 and 7 were put in a heating kneader and kneaded with heating at 95° C. so as to evaporate the excess water therefrom, to obtain a blend, which was then shaped.

The shaped body was dried at 100° C. for 16 hours to prepare a catalyst (Catalyst-10).

The breaking strength of Catalyst-10 was 1.5 kg/mm or more.

Regarding the active metal content in Catalyst-10, the molybdenum content was 15% by weight as $MoO_3$, the cobalt content was 4% by weight as CoO and the phosphorus content was 3% by weight as $P_2O_5$. The amount of mercapto-propionic acid used contained 1.5 times the theoretical amount of sulfur necessary to convert Mo and Co into $MoS_2$ and CoS, respectively.

The desulfurization percentage with Catalyst-10 was 86.0%.

EXAMPLE 11: (Method IV)

219.6 g of 50 wt. % ammonium thioglycolate solution was added to 300 ml of a solution prepared from 38.5 g of molybdenum trioxide, 16.4 g of cobalt carbonate (Co content: 49.1 wt. %), 12.5 g of 85 wt. % phosphoric acid and water, to obtain a phosphoric acid-containing metal mercaptide solution (pH 5.2).

The metal mercaptide solution and 673 g of the same dehydrated boehmite as that used in Examples 5, 6 and 7 were put in a heating kneader and kneaded with heating at 95° C. so as to evaporate the excess water therefrom, to obtain a blend, which was then shaped.

The shaped body was dried at 100° C. for 16 hours to prepare a catalyst (Catalyst-11).

The breaking strength of Catalyst-11 was 1.5 kg/mm or more.

Regarding the active metal content in Catalyst-11, the molybdenum content was 15% by weight as $MoO_3$, the cobalt content was 4% by weight as CoO and the phosphorus content was 3% by weight as $P_2O_5$. The amount of ammonium thioglycolate used contained 1.5 times the theoretical amount of sulfur necessary to convert Mo and Co into $MoS_2$ and CoS, respectively.

The desulfurization percentage with Catalyst-11 was 83.4%.

EXAMPLE 12: (Method IV)

154.8 g of mercapto-acetic acid was added to 300 ml of a solution prepared from 57.6 g of molybdenum trioxide, 20.9 g of nickel carbonate (Ni content: 43.3 wt. %), 30.4 g of 85 wt. % phosphoric acid and water, to obtain a phosphoric acid-containing metal mercaptide solution (pH 0.2).

The metal mercaptide solution and 272 g of the same spray-dried boehmite powder as that used in Example 1 were put in a kneader and kneaded to obtain a blend, which was then shaped.

The shaped body was dried at 100° C. for 16 hours to prepare a catalyst (Catalyst-12).

The breaking strength of Catalyst-12 was 1.5 kg/mm or more.

Regarding the active metal content of Catalyst-12, the molybdenum content was 15% by weight as $MoO_3$, the nickel content was 4% by weight as NiO and the phosphorus content was 6.5% by weight as $P_2O_5$. The amount of mercapto-acetic acid used contained 1.5 times the theoretical amount of sulfur necessary to convert Mo and Ni into $MoS_2$ and NiS, respectively.

The desulfurization percentage with the catalyst was 84.2%.

EXAMPLE 13: (Method V)

400 ml of an aqueous solution (pH 2.0) was prepared from 38.5 g of molybdenum trioxide, 16.4 g of cobalt carbonate (Co content: 49.1 wt. %), 12.5 g of 85 wt. % phosphoric acid and water.

The solution and 272 g of the same spray-dried boehmite powder as that used in Example 1 were put in a kneader and kneaded to obtain a blend, which was then shaped.

The shaped body was dried at 100° C. for 16 hours. Next, the dried body was completely impregnated with 150 ml of an aqueous solution containing 109.1 g of mercapto-acetic acid and then again dried at 100° C. for 16 hours. Accordingly, Catalyst-13 was prepared.

The breaking strength of Catalyst-13 was 1.5 kg/mm or more.

Regarding the active metal content in Catalyst-13, the molybdenum content was 15% by weight as $MoO_3$, the cobalt content was 4% by weight as CoO and the phosphorus content is 3% by weight as $P_2O_5$. The amount of mercapto-acetic acid used contained 1.5 times the theoretical amount of sulfur necessary to convert Mo and Co into $MoS_2$ and COS, respectively.

The desulfurization percentage with Catalyst-13 was 77.8%.

EXAMPLE 14: (Method VI)

219.6 g of 50 wt. % ammonium thioglycolate was added to a solution prepared from 38.5 g of molybdenum trioxide, 16.4 g of cobalt carbonate (Co content: 49.1 wt. %), ammonia gas and water, to obtain 300 ml of a metal mercaptide solution (pH 7.0).

The metal mercaptide solution and 272 g of the same spray-dried boehmite powder as that used in Example 1 were put in a kneader and kneaded to obtain a blend, which was then shaped.

The shaped body was dried at 100° C. for 16 hours. Next, the dried body was completely impregnated with 50 ml of an aqueous solution containing 12.5 g of 85 wt. % phosphoric acid and then again dried at 100° C. for 16 hours. Accordingly, Catalyst-14 was prepared.

The breaking strength of Catalyst-14 was 1.5 kg.mm or more.

Regarding the active metal content in Catalyst-14, the molybdenum content was 15% by weight as $MoO_3$, the cobalt content was 4% by weight as CoO and the phosphorus content was 3% by weight as $P_2O_5$. The amount of ammonium thioglycolate used contained 1.5 times the theoretical amount of sulfur necessary to convert Mo and Co into $MoS_2$ and CoS, respectively.

The desulfurization percentage with Catalyst-14 was 82.8%.

EXAMPLE 15: (Method VII)

272 g of the same spray-dried boehmite as that used in Example 1 and 300 ml of an aqueous solution containing 109.1 g of mercapto-acetic acid and 12.5 g of 85 wt. % phosphoric acid were put in a kneader and kneaded, and the resulting blend was shaped.

The shaped body was dried at 100° C. for 16 hours.

The dried body was completely impregnated with 150 ml of a solution (pH 7.5) prepared from 38.5 g of molybdenum trioxide, 16.4 g of cobalt carbonate (Co content: 49.1 wt. %), ammonia gas and water and then again dried at 100° C. for 16 hours. Accordingly, Catalyst-15 was prepared.

The breaking strength of Catalyst-15 was 1.5 kg/mm or more.

Regarding the active metal content in Catalyst-15, the molybdenum content was 15% by weight as $MoO_3$, the cobalt content was 4% by weight as CoO and the phosphorus content was 3% by weight as $P_2O_5$. The amount of mercapto-acetic acid used contained 1.5 times the theoretical amount of sulfur necessary to convert Mo and Co into $MoS_2$ and CoS, respectively.

The desulfurization percentage with Catalyst-15 was 83.5%.

EXAMPLE 16: (Method VIII)

300 ml of a solution (pH 7.0) prepared from 38.5 g of molybdenum trioxide, 16.4 g of cobalt carbonate (Co content: 49.1 wt. %), ammonia gas and water and 272 g of the same spray-dried boehmite powder as that used in Example 1 were put in a kneader and kneaded to obtain a blend, which was then shaped.

The shaped body was dried at 100° C. for 16 hours. Next, the dried body was completely impregnated with 200 ml of an aqueous solution containing 12.5 g of 85 wt. % phosphoric acid and 109.1 g of mercapto-acetic acid and then again dried at 100° C. for 16 hours. Accordingly, Catalyst-16 was prepared.

The breaking strength of Catalyst-16 was 1.5 kg/mm or more.

Regarding the active metal content in Catalyst-16, the molybdenum content was 15% by weight as $MoO_3$, the cobalt content was 4% by weight as CoO and the phosphorus content was 3% by weight as $P_2O_5$. The amount of mercapto-acetic acid used contained 1.5 times the theoretical amount of sulfur necessary to convert Mo and Co into $MoS_2$ and CoS, respectively.

The desulfurization percentage with Catalyst-16 was 83.2%.

EXAMPLE 17: (Method IX)

272 g of the same spray-dried boehmite powder as that used in Example 1 and 300 ml of an aqueous solution containing 109.1 g of mercapto-acetic acid were put in a kneader and kneaded, and the resulting blend was shaped. The shaped body was dried at 100° C. for 16 hours.

The dried shaped body was completely impregnated with 100 ml of a solution (pH 2.0) prepared from 38.5 g of molybdenum trioxide, 16.4 g of cobalt carbonate (Co content: 49.1 wt. %), 12.5 g of 85 wt. % phosphoric acid and water and then again dried at 100° C. for 16 hours. Accordingly, Catalyst-17 was prepared.

The breaking strength of Catalyst-17 was 1.5 kg/mm or more.

Regarding the active metal content in Catalyst-17, the molybdenum content was 15% by weight as $MoO_3$, the cobalt content was 4% by weight as CoO and the phosphorus content was 3% by weight as $P_2O_5$. The amount of mercapto-acetic acid used contained 1.5 times the theoretical amount of sulfur necessary to convert Mo and Co into $MoS_2$ and CoS, respectively.

The desulfurization percentage with Catalyst-17 was 84.2%.

EXAMPLE 18: (Method X)

272 g of the same spray-dried boehmite powder as that used in Example 1 and 300 ml of an aqueous solution containing 12.5 g of 85 wt. % phosphoric acid were put in a kneader and kneaded, and the resulting blend was shaped.

The shaped body was dried at 100° C. for 16 hours.

The dried and shaped body was completely impregnated with 250 ml of a solution (pH 6.2) or a metal mercaptide obtained by adding 219.6 g of ammonium thioglycolate to a solution prepared from 38.5 g of molybdenum trioxide, 16.4 g of cobalt carbonate (Co content: 49.1 wt. %), ammonia gas and water, and then again dried at 100° C. for 16 hours. Accordingly, Catalyst-18 was prepared.

The breaking strength of Catalyst-18 was 1.5 kg/mm or more.

Regarding the active metal content in Catalyst-18, the molybdenum content was 15% by weight as $MoO_3$, the cobalt content was 4% by weight as CoO and the phosphorus content was 3% by weight as $P_2O_5$. The amount of ammonium thioglycolate used contained 1.5 times the theoretical amount of sulfur necessary to convert Mo and Co into $MoS_2$ and CoS, respectively.

The desulfurization percentage with Catalyst-18 was 83.0%.

EXAMPLE 19: (Method I)

Catalyst-19 was prepared in the same manner as Example 1, except that 102.7 g of methyl mercapto-acetate was used as the sulfurizing agent.

The breaking strength of Catalyst-19 was 1.5 kg/mm or more.

Regarding the active metal content in Catalyst-19, the molybdenum content was 15% by weight as $MoO_3$ and the cobalt content was 4% by weight as CoO. The amount of methyl mercaptoacetate used contained 1.5 times the theoretical amount of sulfur necessary to convert Mo and Co into $MoS_2$ and CoS, respectively.

The desulfurization percentage with Catalyst-19 was 82.7%.

EXAMPLE 20: (Method I)

Catalyst-20 was prepared in the same manner as Example 2, except that 71.7 g of methyl mercapto-acetate was used as the sulfurizing agent.

The breaking strength of Catalyst-20 was 1.5 kg/mm or more.

Regarding the active metal content in Catalyst-20, the tungsten content was 15% by weight as $WO_3$ and the cobalt content was 4% by weight as CoO. The amount of methyl mercapto-acetate used contained 1.5 times the theoretical amount of sulfur necessary to convert W and Co into $WS_2$ and CoS, respectively.

The desulfurization percentage with Catalyst-20 was 82.1%.

EXAMPLE 21: (Method II)

Catalyst-21 was prepared in the same manner as Example 3, except that 116.3 g of methyl 3-mercapto-propionate was used as the sulfurizing agent.

The breaking strength of Catalyst-21 was 1.5 kg/mm or more.

Regarding the active metal content in Catalyst-21, the molybdenum content was 15% by weight as $MoO_3$ and the cobalt content was 4% by weight as CoO. The amount of methyl 3-mercapto-propionate used contained 1.5 times the theoretical amount of sulfur necessary to convert Mo and Co into $MoS_2$ and CoS, respectively.

The desulfurization percentage with Catalyst-21 was 81.0%.

EXAMPLE 22: (Method III)

Catalyst-22 was prepared in the same manner as Example 4, except that 116.3 g of ethyl 2-mercapto-acetate was used as the sulfurizing agent.

The breaking strength of Catalyst-22 was 1.5 kg/mm or more.

Regarding the active metal content in Catalyst-22, the molybdenum content was 15% by weight as $MoO_3$ and the cobalt content was 4% by weight as CoO. The amount of ethyl 2-mercapto-acetate used contained 1.5 times the theoretical amount of sulfur necessary to convert Mo and Co into $MoS_2$ and CoS, respectively.

The desulfurization percentage with Catalyst-22 was 81.5%.

EXAMPLE 23: (Method IV)

Catalyst-23 was obtained in the same manner as Example 5, except that 106.8 g of methyl mercapto-acetate was used as the sulfurizing agent.

The breaking strength of Catalyst-23 was 1.5 kg/mm or more.

Regarding the active metal content in Catalyst-23, the molybdenum content was 15% by weight as $MoO_3$, the cobalt content was 4% by weight as CoO and the phosphorus content was 3% by weight as $P_2O_5$. The amount of methyl mercapto-acetate used contained 1.5 times the theoretical amount of sulfur necessary to convert Mo and Co into $MoS_2$ and CoS, respectively.

The desulfurization percentage with Catalyst-23 was 82.2%.

EXAMPLE 24: (Method IV)

Catalyst-24 was obtained in the same manner as Example 8, except that 106.8 g of methyl mercapto-acetate was used as the sulfurizing agent.

The breaking strength of Catalyst-24 was 1.5 kg/mm or more.

Regarding the active metal content in Catalyst-24, the molybdenum content was 15% by weight as $MoO_3$, the cobalt content was 4% by weight as CoO and the phosphorus content was 3% by weight as $P_2O_5$. The amount of methyl mercapto-acetate used contained 1.5 times the theoretical amount of sulfur necessary to convert Mo and Co into $MoS_2$ and CoS, respectively.

The desulfurization percentage with Catalyst-24 was 83.0%.

EXAMPLE 25: (Method IV)

Catalyst-25 was prepared in the same manner as Example 9, except that 120.9 g of methyl 3-mercapto-propionate was used as the sulfurizing agent.

The breaking strength of Catalyst-25 was 1.5 kg/mm or more.

Regarding the active metal content in Catalyst-25, the molybdenum content was 15% by weight as $MoO_3$, the cobalt content was 4% by weight as CoO and the phosphorus content was 3% by weight as $P_2O_5$. The amount of methyl 3-mercapto-propionate used contained 1.5 times the theoretical amount of sulfur necessary to convert Mo and Co into $MoS_2$ and CoS, respectively.

The desulfurization percentage with Catalyst-25 was 82.0%.

EXAMPLE 26: (Method IV)

Catalyst-26 was prepared in the same manner as Example 5, except that 120.9 g of methyl 3-mercapto-propionate was used as the sulfurizing agent.

The breaking strength of Catalyst-26 was 1.5 kg/mm or more.

Regarding the active metal content in Catalyst-26, the molybdenum content was 15% by weight as $MoO_3$, the cobalt content was 4% by weight as CoO and the phosphorus content was 3% by weight as $P_2O_5$. The amount of methyl 3-mercapto-propionate used contained 1.5 times the theoretical amount of sulfur neces-

EXAMPLE 27: (Method IV)

Catalyst-27 was prepared in the same manner as Example 8, except that 120.9 g of methyl 3-mercapto-propionate was used as the sulfurizing agent.

The breaking strength of Catalyst-27 was 1.5 kg/mm or more.

Regarding the active metal content in Catalyst-27, the molybdenum content was 15% by weight as $MoO_2$, the cobalt content was 4% by weight as CoO and the phosphorus content was 3% by weight as $P_2O_5$. The amount of methyl 3-mercapto-propionate used contained 1.5 times the theoretical amount of sulfur necessary to convert Mo and Co into $MoS_2$ and CoS, respectively.

The desulfurization percentage with Catalyst-27 was 81.5%.

EXAMPLE 28: (Method IV)

Catalyst-28 was prepared in the same manner as Example 12, except that 151.6 g of methyl mercapto-acetate was used as the sulfurizing agent.

The breaking strength of Catalyst-28 was 1.5 kg/mm or more.

Regarding the active metal content in Catalyst-28, the molybdenum content was 20% by weight as $MoO_3$, the nickel content was 4% by weight as NiO and the phosphorus content was 6.5% by weight as $P_2O_5$. The amount of methyl mercapto-acetate used contained 1.5 times the theoretical amount of sulfur necessary to convert Mo and Ni into $MoS_2$ and NiS, respectively.

The desulfurization percentage with Catalyst-28 was 79.0%.

EXAMPLE 29: (Method V)

Catalyst-29 was prepared in the same manner as Example 13, except that 106.8 g of methyl mercapto-acetate was used as the sulfurizing agent.

The breaking strength of Catalyst-29 was 1.5 kg/mm or more.

Regarding the active metal content in Catalyst-29, the molybdenum content was 15% by weight as $MoO_3$, the cobalt content was 4% by weight as CoO and the phosphorus content was 3% by weight as $P_2O_5$. The amount of methyl mercapto-acetate used contained 1.5 times the theoretical amount of sulfur necessary to convert Mo and Co into $MoS_2$ and CoS, respectively.

The desulfurization percentage with Catalyst-29 was 81.8%.

EXAMPLE 30: (Method VI)

Catalyst-30 was prepared in the same manner as Example 14, except that 120.9 g of ethyl 2-mercapto-acetate was used as the sulfurizing agent.

The breaking strength of Catalyst-30 was 1.5 kg/mm or more.

Regarding the active metal content in Catalyst-30, the molybdenum content was 15% by weight as $MoO_3$ and the cobalt content was 4% by weight as CoO and the phosphorus content was 3% by weight as $P_2O_5$. The amount of ethyl 2-mercapto-acetate used contained 1.5 times the theoretical amount of sulfur necessary to convert Mo and Co into $MoS_2$ and CoS, respectively.

The desulfurization percentage with Catalyst-30 was 81.8% by weight.

EXAMPLE 31: (Method VII)

Catalyst-31 was prepared in the same manner as Example 15, except that 205.5 g of 2-ethylhexyl mercapto-acetate was used as the sulfurizing agent.

The breaking strength of Catalyst-31 was 1.5 kg/mm or more.

Regarding the active metal content in Catalyst-31, the molybdenum content was 15% by weight as $MoO_3$, the cobalt content was 4% by weight as CoO and the phosphorus content was 3% by weight as $P_2O_5$. The amount of 2-ethylhexyl mercapto-acetate used contained 1.5 times the theoretical amount of sulfur necessary to convert Mo and Co into $MoS_2$ and CoS, respectively.

The desulfurization percentage with Catalyst-31 was 81.2%.

EXAMPLE 32: (Method VIII)

Catalyst-32 was prepared in the same manner as Example 16, except that 120.9 g of methyl 3-mercapto-propionate was used as the sulfurizing agent.

The breaking strength of Catalyst-32 was 1.5 kg/mm or more.

Regarding the active metal content in Catalyst-32, the molybdenum content was 15% by weight as $MoO_3$, the cobalt content was 4% by weight as CoO and the phosphorus content was 3% by weight as $P_2O_5$. The amount of methyl 3-mercapto-propionate used contained 1.5 times the theoretical amount of sulfur necessary to convert Mo and Co into $MoS_2$ and CoS, respectively.

The desulfurization percentage with Catalyst-32 was 81.2%.

EXAMPLE 33: (Method IX)

Catalyst-33 was obtained in the same manner as Example 17, except that 106.8 g of methyl mercapto-acetate was used as the sulfurizing agent.

The breaking strength of Catalyst-33 was 1.5 kg/mm or more.

Regarding the active metal content in Catalyst-33, the molybdenum content was 15% by weight as $MoO_3$, the cobalt content was 4% by weight as CoO and the phosphorus content was 3% by weight as $P_2O_5$. The amount of methyl mercapto-acetate used contained 1.5 times the theoretical amount of sulfur necessary to convert Mo and Co into $MoS_2$ and CoS, respectively.

The desulfurization percentage with Catalyst-33 was 81.9%.

EXAMPLE 34: (Method X)

Catalyst-34 was prepared in the same manner as Example 18, except that 120.9 g of methyl 3-mercapto-propionate was used as the sulfurizing agent.

The breaking strength of Catalyst-34 was 1.5 kg/mm or more.

Regarding the active metal content in Catalyst-34, the molybdenum content was 15% by weight as $MoO_3$, the cobalt content was 4% by weight as CoO and the phosphorus content was 3% by weight as $P_2O_5$. The amount of methyl 3-mercapto-propionate used contained 1.5 times the theoretical amount of sulfur necessary to convert Mo and Co into $MoS_2$ and CoS, respectively.

The desulfurization percentage with Catalyst-34 was 80.9%.

EXAMPLE 35: (Method I)

Catalyst-35 was prepared in the same manner as Example 1, except that 75.2 g of thioacetic acid was used as the sulfurizing agent.

The breaking strength of Catalyst-35 was 1.5 kg/mm or more.

Regarding the active metal content in Catalyst-35, the molybdenum content was 15% by weight as $MoO_3$ and the cobalt content was 4% by weight as CoO. The amount of thioacetic acid used contained 1.5 times the theoretical amount of sulfur necessary to convert Mo and Co into $MoS_2$ and CoS, respectively.

The desulfurization percentage with Catalyst-35 was 82.8%.

EXAMPLE 36: (Method I)

Catalyst-36 was prepared in the same manner as Example 2, except that 52.3 g of thioacetic acid was used as the sulfurizing agent.

The breaking strength of Catalyst-36 was 1.5 kg/mm or more.

Regarding the active metal content in Catalyst-36, the tungsten content was 15% by weight as $WO_3$ and the cobalt content was 4% by weight as CoO. The amount of thioacetic acid used contained 1.5 times the theoretical amount of sulfur necessary to convert W and Co into $WS_2$ and CoS, respectively.

The desulfurization percentage of Catalyst-36 was 82.0%.

EXAMPLE 37: (Method II)

Catalyst-37 was prepared in the same manner as Example 3, except that 75.2 g of thioacetic acid was used as the sulfurizing agent.

The breaking strength of Catalyst-37 was 1.5 kg/mm or more.

Regarding the active metal content in Catalyst-37, the molybdenum content was 15% by weight as $MoO_3$ and the cobalt content was 4% by weight as CoO. The amount of thioacetic acid used contained 1.5 times the theoretical amount of sulfur necessary to convert Mo and Co into $MoS_2$ and CoS, respectively.

The desulfurization percentage of Catalyst-37 was 82.3%.

EXAMPLE 38: (Method III)

Catalyst-38 was prepared in the same manner as Example 4, except that 133.6 g of thiobenzoic acid was used as the sulfurizing agent.

The breaking strength of Catalyst-38 was 1.5 kg/mm or more.

Regarding the active metal content in Catalyst-38, the molybdenum content was 15% by weight as $MoO_3$ and the cobalt content was 4% by weight as CoO. The amount of thiobenzoic acid used contained 1.5 times the theoretical amount of sulfur necessary to convert Mo and Co into $MoS_2$ and CoS, respectively.

The desulfurization percentage with Catalyst-38 was 81.9%.

EXAMPLE 39: (Method IV)

Catalyst-39 was prepared in the same manner as Example 5, except that 78.2 g of thioacetic acid was used as the sulfurizing agent.

The breaking strength of Catalyst-39 was 1.5 kg/mm or more. 10 Regarding the active metal content in Catalyst-39, the molybdenum content was 15% by weight as $MoO_3$, the cobalt content was 4% by weight as CoO and the phosphorus content was 3% by weight as $P_2O_5$. The amount of thioacetic acid used contained 1.5 times the theoretical amount of sulfur necessary to convert Mo and Co into $MoS_2$ and CoS, respectively.

The desulfurization percentage with Catalyst-39 was 83.0%.

EXAMPLE 40: (Method IV)

Catalyst-40 was prepared in the same manner as Example 8, except that 78.2 g of thioacetic acid was used as the sulfurizing agent.

The breaking strength of Catalyst-40 was 1.5 kg/mm or more.

Regarding the active metal content in Catalyst-40, the molybdenum content was 15% by weight as $MoO_3$, the cobalt content was 4% by weight as CoO and the phosphorus content was 3% by weight as $P_2O_5$. The amount of thioacetic acid used contained 1.5 times the theoretical amount of sulfur necessary to convert Mo and Co into $MoS_2$ and CoS, respectively.

The desulfurization percentage with Catalyst-40 was 83.6%.

EXAMPLE 41: (Method IV)

Catalyst-41 was prepared in the same manner as Example 9, except that 139.0 g of thiobenzoic acid was used as the sulfurizing agent.

The breaking strength of Catalyst-41 was 1.5 kg/mm or more.

Regarding the active metal content in Catalyst-41, the molybdenum content was 15% by weight as $MoO_3$, the cobalt content was 4% by weight as CoO and the phosphorus content was 3% by weight as $P_2O_5$. The amount of thiobenzoic acid used contained 1.5 times the theoretical amount of sulfur necessary to convert Mo and Co into $MoS_2$ and CoS, respectively.

The desulfurization percentage with Catalyst-41 was 85.8%.

EXAMPLE 42: (Method IV)

Catalyst-42 was prepared in the same manner as Example 5, except that 139.0 g of thiobenzoic acid was used as the sulfurizing agent.

The breaking strength of Catalyst-42 was 1.5 kg/mm or more.

Regarding the active metal content in Catalyst-42, the molybdenum content was 15% by weight as $MoO_3$, the cobalt content was 4% by weight as CoO and the phosphorus content was 3% by weight as $P_2O_5$. The amount of thiobenzoic acid used contained 1.5 times the theoretical amount of sulfur necessary to convert Mo and Co into $MoS_2$ and CoS, respectively.

The desulfurization percentage with Catalyst-42 was 83.8%.

EXAMPLE 43: (Method IV)

Catalyst-43 was prepared in the same manner as Example 8, except that 139.0 g of thiobenzoic acid was used as the sulfurizing agent.

The breaking strength of Catalyst-43 was 1.5 kg/mm or more.

Regarding the active metal content in Catalyst-43, the molybdenum content was 15% by weight as $MoO_3$, the cobalt content was 4% by weight as CoO and the phosphorus content was 3% by weight as $P_2O_5$. The amount of thiobenzoic acid used contained 1.5 times the theoretical amount of sulfur necessary to convert Mo and Co into $MoS_2$ and CoS, respectively.

The desulfurization percentage with Catalyst-43 was 84.2%.

EXAMPLE 44: (Method IV)

Catalyst-44 was prepared in the same manner as Example 13, except that 110.9 g of thioacetic acid was used as the sulfurizing agent.

The breaking strength of Catalyst-44 was 1.5 kg/mm or more.

Regarding the active metal content in Catalyst-44, the molybdenum content was 20% by weight as $MoO_3$, the nickel content was 4% by weight as NiO and the phosphorus content was 6.5% by weight as $P_2O_5$. The amount of thioacetic acid used contained 1.5 times the theoretical amount of sulfur necessary to convert Mo and Ni into $MoS_2$ and NiS, respectively.

The desulfurization percentage with Catalyst-44 was 80.5%.

EXAMPLE 45: (Method V)

Catalyst-45 was prepared in the same manner as Example 13, except that 78.2 g of thioacetic acid was used as the sulfurizing agent.

The breaking strength of Catalyst-45 was 1.5 kg/mm or more.

Regarding the active metal content in Catalyst-45, the molybdenum content was 15% by weight as $MoO_3$, the cobalt content was 4% by weight as CoO and the phosphorus content was 3% by weight as $P_2O_5$. The amount of thioacetic acid used contained 1.5 times the theoretical amount of sulfur necessary to convert Mo and Co into $MoS_2$ and CoS, respectively.

The desulfurization percentage with Catalyst-45 was 81.5%.

EXAMPLE 46: (Method VI)

Catalyst-46 was prepared in the same manner as Example 14, except that 139.0 g of thiobenzoic acid was used as the sulfurizing agent.

The breaking strength of Catalyst-46 was 1.5 kg/mm or more.

Regarding the active metal content in Catalyst-46, the molybdenum content was 15% by weight as $MoO_3$, the cobalt content was 4% by weight as CoO and the phosphorus content was 3% by weight as $P_2O_5$. The amount of thiobenzoic acid used contained 1.5 times the theoretical amount of sulfur necessary to convert Mo and Co into $MoS_2$ and CoS, respectively.

The desulfurization percentage with Catalyst-46 was 83.1%.

EXAMPLE 47: (Method VII)

Catalyst-47 was prepared in the same manner as Example 15, except that 78.2 g of thioacetic acid was used as the sulfurizing agent.

The breaking strength of Catalyst-47 was 1.5 kg/mm or more.

Regarding the active metal content in Catalyst-47, the molybdenum content was 15% by weight as $MoO_3$, the cobalt content was 4% by weight as CoO and the phosphorus content was 3% by weight as $P_2O_5$. The amount of thioacetic acid used contained 1.5 times the theoretical amount of sulfur necessary to convert Mo and Co into $MoS_2$ and CoS, respectively.

The desulfurization percentage with Catalyst-47 was 82.5%.

EXAMPLE 48: (Method VIII)

Catalyst-48 was prepared in the same manner as Example 16, except that 78.2 g of thioacetic acid was used as the sulfurizing agent.

The breaking strength of Catalyst-48 was 1.5 kg/mm or more.

Regarding the active metal content in Catalyst-48, the molybdenum content was 15% by weight as $MoO_3$, the cobalt content was 4% by weight as CoO and the phosphorus content was 3% by weight as $P_2O_5$. The amount of thioacetic acid used contained 1.5 times the theoretical amount of sulfur necessary to convert Mo and Co into $MoS_2$ and CoS, respectively.

The desulfurization percentage with Catalyst-48 was 82.5%.

EXAMPLE 49: (Method IX)

Catalyst-49 was prepared in the same manner as Example 17, except that 78.2 g of thioacetic acid was used as the sulfurizing agent.

The breaking strength of Catalyst-49 was 1.5 kg/mm or more.

Regarding the active metal content in Catalyst-49, the molybdenum content was 15% by weight as $MoO_3$, the cobalt content was 4% by weight as CoO and the phosphorus content was 3% by weight as $P_2O_5$. The amount of thioacetic acid used contained 1.5 times the theoretical amount of sulfur necessary to convert Mo and Co into $MoS_2$ and CoS, respectively.

The desulfurization percentage with Catalyst-49 was 82.8%.

EXAMPLE 50: (Method X)

Catalyst-50 was prepared in the same manner as Example 18, except that 78.2 g of thioacetic acid was used as the sulfurizing agent.

The breaking strength of Catalyst-50 was 1.5 kg/mm or more.

Regarding the active metal content in Catalyst-50, the molybdenum content was 15% by weight as $MoO_3$, the cobalt content was 4% by weight as CoO and the phosphorus content was 3% by weight as $P_2O_5$. The amount of thioacetic acid used contained 1.5 times the theoretical amount of sulfur necessary to convert Mo and Co into $MoS_2$ and CoS, respectively.

The desulfurization percentage with Catalyst-50 was 82.5%.

EXAMPLE 51: (Method I)

Catalyst-51 was prepared in the same manner as Example 1, except that 74.6 g of 2-aminoethanethiol was used as the sulfurizing agent.

The breaking strength of Catalyst-51 was 1.5 kg/mm or more.

Regarding the active metal content in Catalyst-51, the molybdenum content was 15% by weight as $MoO_3$ and the cobalt content was 4% by weight as CoO. The amount of 2-aminoethanethiol used contained 1.5 times the theoretical amount of sulfur necessary to convert Mo and Co into $MoS_2$ and CoS, respectively.

The desulfurization percentage with Catalyst-51 was 81.8%.

EXAMPLE 52: (Method I)

Catalyst-52 was prepared in the same manner as Example 2, except that 52.1 g of 2-aminoethanethiol was used as the sulfurizing agent.

The breaking strength of Catalyst-52 was 1.5 kg/mm or more.

Regarding the active metal content in Catalyst-52, the tungsten content was 15% by weight as $WO_3$ and the cobalt content was 4% by weight as CoO. The amount of 2-aminoethanethiol used contained 1.5 times the theoretical amount of sulfur necessary to convert S and Co into $SW_2$ and CoS, respectively.

The desulfurization percentage with Catalyst-52 was 81.5%.

EXAMPLE 53: (Method II)

Catalyst-53 was prepared in the same manner as Example 3, except that 74.6 g of 2-aminoethanethiol was used as the sulfurizing agent.

The breaking strength of Catalyst-53 was 1.5 kg/mm or more.

Regarding the active metal content in Catalyst-53, the molybdenum content was 15% by weight as $MoO_3$ and the cobalt content was 4% by weight as CoO. The amount of 2-aminoethanethiol used contained 1.5 times the theoretical amount of sulfur necessary for converting Mo and Co into $MoS_2$ and CoS, respectively.

The desulfurization percentage with Catalyst-53 was 81.5%.

EXAMPLE 54: (Method III)

Catalyst-54 was prepared in the same manner as Example 4, except that 121.2 g of 4-aminothiophenol was used as the sulfurizing agent.

The breaking strength of Catalyst-54 was 1.5 kg/mm or more.

Regarding the active metal content in Catalyst-54, the molybdenum content was 15% by weight as $MoO_3$ and the cobalt content was 4% by weight as CoO. The amount of 4-aminothiophenol used contained 1.5 times the theoretical amount of sulfur necessary to convert Mo and Co into $MoS_2$ and CoS, respectively.

The desulfurization percentage of Catalyst-54 was 81.3%.

EXAMPLE 55: (Method IV)

Catalyst-55 was prepared in the same manner as Example 5, except that 77.6 g of 2-aminoethanethiol was used as the sulfurizing agent.

The breaking strength of Catalyst-55 was 1.5 kg/mm or more.

Regarding the active metal content in Catalyst-55, the molybdenum content was 15% by weight as $MoO_3$, the cobalt content was 4% by weight and the phosphorus content was 3% by weight as $P_2O_5$. The amount of 2-aminoethanethiol used contained 1.5 times the theoretical amount of sulfur necessary to convert Mo and Co into $MoS_2$ and CoS, respectively.

The desulfurization percentage with Catalyst-55 was 81.8%.

EXAMPLE 56: (Method IV)

Catalyst-56 was prepared in the same manner as Example 8, except that 77.6 g of 2-aminoethanethiol was used as the sulfurizing agent.

The breaking strength of Catalyst-56 was 1.5 kg/mm or more.

Regarding the active metal content in Catalyst-56, the molybdenum content was 15% by weight as $MoO_2$, the cobalt content was 4% by weight as CoO and the phosphorus content was 3% by weight as $P_2O_5$. The amount of 2-aminoethanethiol used contained 1.5 times the sulfur necessary to convert Mo and Co into $MoS_2$ and CoS, respectively.

The desulfurization percentage with Catalyst-56 was 82.5%.

EXAMPLE 57: (Method IV)

Catalyst-57 was prepared in the same manner as Example 9, except that 125.9 g of 4-aminothiophenol was used as the sulfurizing agent.

The breaking strength of Catalyst-57 was 1.5 kg/mm or more.

Regarding the active metal content in Catalyst-57, the molybdenum content was 15% by weight as $MoO_3$, the cobalt content was 4% by weight as CoO and the phosphorus content was 3% by weight as $P_2O_5$. The amount of 4-aminothiophenol used contained 1.5 times the theoretical amount of sulfur necessary to convert Mo and Co into $MoS_2$ and CoS, respectively.

The desulfurization percentage with Catalyst-57 was 83.8%.

EXAMPLE 58: (Method IV)

Catalyst-58 was prepared in the same manner as Example 5, except that 125.9 g of 4-aminothiophenol was used as the sulfurizing agent.

The breaking strength of Catalyst-58 was 1.5 kg/mm or more.

Regarding the active metal content in Catalyst-58, the molybdenum content was 15% by weight as $MoO_3$, the cobalt content was 4% by weight as CoO and the phosphorus content was 3% by weight as $P_2O_5$. The amount of 4-aminothiophenol used contained 1.5 times the theoretical amount of sulfur necessary to convert Mo and Co into $MoS_2$ and CoS, respectively.

The desulfurization percentage with Catalyst-58 was 82.6%.

EXAMPLE 59: (Method IV)

Catalyst-59 was prepared in the same manner as Example 8, except that 125.9 g of 4-aminothiophenol was used as the sulfurizing agent.

The breaking strength of Catalyst-59 was 1.5 kg/mm or more.

Regarding the active metal content in Catalyst-59, the molybdenum content was 15% by weight as $MoO_3$, the cobalt content was 4% by weight as CoO and the phosphorus content was 3% by weight as $P_2O_5$. The amount of 4-aminothiophenol used contained 1.5 times the theoretical amount of sulfur necessary to convert Mo and Co into $MoS_2$ and CoS, respectively.

The desulfurization percentage with Catalyst-59 was 83.5%.

EXAMPLE 60: (Method IV)

Catalyst-60 was prepared in the same manner as Example 12, except that 110.1 g of 2-aminoethanethiol was used as the sulfurizing agent.

The breaking strength of Catalyst-60 was 1.5 kg/mm or more.

Regarding the active metal content in Catalyst-60, the molybdenum content was 20% by weight as $MoO_3$, the nickel content was 4% by weight as NiO and the phosphorus content was 6.5% by weight as $P_2O_5$. The amount of 2-aminoethanethiol used contained 1.5 times the theoretical amount of sulfur necessary to convert Mo and Ni into $MoS_2$ and NiS, respectively.

The desulfurization percentage with Catalyst-60 was 77.8%.

EXAMPLE 61: (Method V)

Catalyst-61 was prepared in the same manner as Example 13, except that 77.6 g of 2-aminoethanethiol was used as the sulfurizing agent.

The breaking strength of Catalyst-61 was 1.5 kg/mm or more.

Regarding the active metal content in Catalyst-61, the molybdenum content was 15% by weight as $MoO_3$, the cobalt content was 4% by weight as CoO and the phosphorus content was 3% by weight as $P_2O_5$. The amount of 2-aminoethanethiol used contained 1.5 times the theoretical amount of sulfur necessary to convert Mo and Co into $MoS_2$ and CoS, respectively.

The desulfurization percentage with Catalyst-61 was 82.0%.

EXAMPLE 62: (Method VI)

Catalyst-62 was prepared in the same manner as Example 14, except that 125.9 g of 4-aminothiophenol was used as the sulfurizing agent.

The breaking strength of Catalyst-62 was 1.5 kg/mm or more.

Regarding the active metal content in Catalyst-62, the molybdenum content was 15% by weight as $MoO_3$, the cobalt content was 4% by weight as CoO and the phosphorus content was 3% by weight as $P_2O_5$. The amount of 4-aminothiophenol used contained 1.5 times the theoretical amount of sulfur necessary to convert Mo and Co into $MoS_2$ and CoS, respectively.

The desulfurization percentage with Catalyst-62 was 83.2%.

EXAMPLE 63: (Method VII)

Catalyst-63 was prepared in the same manner as Example 15, except that 77.6 g of 2-aminoethanethiol was used as the sulfurizing agent.

The breaking strength of Catalyst-63 was 1.5 kg/mm or more.

Regarding the active metal content in Catalyst-63, the molybdenum content was 15% by weight as $MoO_3$, the cobalt content was 4% by weight as CoO and the phosphorus content was 3% by weight as $P_2O_5$. The amount of 2-aminoethanethiol used contained 1.5 times the theoretical amount of sulfur necessary to convert Mo and Co into $MoS_2$ and CoS, respectively.

The desulfurization percentage with Catalyst-63 was 81.8%.

EXAMPLE 64: (Method VIII)

Catalyst-64 was prepared in the same manner as Example 16, except that 77.6 g of 2-aminoethanethiol was used as the sulfurizing agent.

The breaking strength of Catalyst-64 was 1.5 kg/mm or more.

Regarding the active metal content in Catalyst-64, the molybdenum content was 15% by weight as $MoO_3$, the cobalt content was 4% by weight as CoO and the phosphorus content was 3% by weight as $P_2O_5$. The amount of 2-aminoethanethiol used contained 1.5 times the theoretical amount of sulfur necessary to convert Mo and Co into $MoS_2$ and CoS, respectively.

The desulfurization percentage with Catalyst-64 was 81.9%.

EXAMPLE 65: (Method IX)

Catalyst-65 was prepared in the same manner as Example 17, except that 77.6 g of 2-aminoethanethiol was used as the sulfurizing agent.

The breaking strength of Catalyst-65 was 1.5 kg/mm or more.

Regarding the active metal content in Catalyst-65, the molybdenum content was 15% by weight as $MoO_3$, the cobalt content was 4% by weight as CoO and the phosphorus content was 3% by weight as $P_2O_5$. The amount of 2-aminoethanethiol used contained 1.5 times the theoretical amount of sulfur necessary to convert Mo and Co into $MoS_2$ and CoS, respectively.

The desulfurization percentage with Catalyst-65 was 81.6%.

EXAMPLE 66: (Method X)

Catalyst-66 was prepared in the same manner as Example 18, except that 77.6 g of 2-aminoethanethiol was used as the sulfurizing agent.

The breaking strength of Catalyst-66 was 1.5 kg/mm or more.

Regarding the active metal content in Catalyst-66, the molybdenum content was 15% by weight as $MoO_3$, the cobalt content was 4% by weight as CoO and the phosphorus content was 3% by weight as $P_2O_5$. The amount of 2-aminoethanethiol used contained 1.5 times the theoretical amount of sulfur necessary to convert Mo and Co into $MoS_2$ and CoS, respectively.

The desulfurization percentage with Catalyst-66 was 81.5%.

EXAMPLE 67: (Method I)

Catalyst-67 was prepared in the same manner as Example 1, except that 45.5 g of ethanedithiol was used as the sulfurizing agent.

The breaking strength of Catalyst-67 was 1.5 kg/mm or more.

Regarding the active metal content in Catalyst-67, the molybdenum content was 15% by weight as $MoO_3$ and the cobalt content was 4% by weight as CoO. The amount of ethanedithiol used contained 1.5 times the theoretical amount of sulfur necessary to convert Mo and Co into $MoS_2$ and CoS, respectively.

The desulfurization percentage with Catalyst-67 was 86.0%.

EXAMPLE 68: (Method I)

Catalyst-68 was prepared in the same manner as Example 2, except that 31.8 g of ethanedithiol was used as the sulfurizing agent.

The breaking strength of Catalyst-68 was 1.5 kg/mm or more.

Regarding the active metal content in Catalyst-68, the tungsten content was 15% by weight as $WO_3$ and the cobalt content was 4% by weight as CoO. The amount of ethanedithiol used contained 1.5 times the theoretical amount of sulfur necessary to convert W and Co into $WS_2$ and CoS, respectively.

The desulfurization percentage with Catalyst-68 was 84.5%.

EXAMPLE 69: (Method I)

Catalyst-69 was prepared in the same manner as Example 1, except that 76.5 g of 2-mercaptoethanol was used as the sulfurizing agent.

The breaking strength of Catalyst-69 was 1.5 kg/mm or more.

Regarding the active metal content in Catalyst-69, the molybdenum content was 15% by weight as $MoO_3$ and the cobalt content was 4% by weight as CoO. The amount of 2-mercaptoethanol used contained 1.5 times the theoretical amount of sulfur necessary to convert Mo and Co into $MoS_2$ and CoS, respectively.

The desulfurization percentage with Catalyst-69 was 87.0%.

EXAMPLE 70: (Method I)

Catalyst-70 was prepared in the same manner as Example 2, except that 52.8 g of 2-mercaptoethanol was used as the sulfurizing agent.

The breaking strength of Catalyst-70 was 1.5 kg/mm or more.

Regarding the active metal content in Catalyst-70, the tungsten content was 15% by weight as $WO_3$ and the cobalt content was 4% by weight as CoO. The amount of 2-mercaptoethanol used contained 1.5 times the theoretical amount of sulfur necessary to convert W and Co into $WS_2$ and CoS, respectively.

The desulfurization percentage with Catalyst-70 was 86.3%.

EXAMPLE 71: (Method II)

Catalyst-71 was prepared in the same manner as Example 3, except that 45.5 g of ethanedithiol was used as the sulfurizing agent.

The breaking strength of Catalyst-71 was 1.5 kg/mm or more.

Regarding the active metal content in Catalyst-71, the molybdenum content was 15% by weight as $MoO_3$ and the cobalt content was 4% by weight as CoO. The amount of ethanedithiol used contained 1.5 times the theoretical amount of sulfur necessary to convert Mo and Co into $MoS_2$ and CoS, respectively.

The desulfurization percentage with Catalyst-71 was 85.0%.

EXAMPLE 72: (Method II)

Catalyst-72 was prepared in the same manner as Example 3, except that 104.6 g of 3-mercapto-1,2-propanediol was used as the sulfurizing agent.

The breaking strength of Catalyst-72 was 1.5 kg/mm or more.

Regarding the active metal content in Catalyst-72, the molybdenum content was 15% by weight as $MoO_3$ and the cobalt content was 4% by weight as CoO. The amount of 3-mercapto-1,2-propanediol used contained 1.5 times the theoretical amount of sulfur necessary to convert Mo and Co into $MoS_2$ and CoS, respectively.

The desulfurization percentage with Catalyst-72 was 84.0%.

EXAMPLE 73: (Method III)

Catalyst-73 was prepared in the same manner as Example 4, except that 59.1 g of 1,4-butanedithiol was used as the sulfurizing agent.

The breaking strength of Catalyst-73 was 1.5 kg/mm or more.

Regarding the active metal content in Catalyst-73, the molybdenum content was 15% by weight as $MoO_3$ and the cobalt content was 4% by weight as CoO. The amount of 1,4-butanedithiol used contained 1.5 times the theoretical amount of sulfur necessary to convert Mo and Co into $MoS_2$ and CoS, respectively.

The desulfurization percentage with Catalyst-73 was 83.5%.

EXAMPLE 74: (Method III)

Catalyst-74 was prepared in the same manner as Example 4, except that 122.0 g of 4-mercaptophenol was used as the sulfurizing agent.

The breaking strength of Catalyst-74 was 1.5 kg/mm or more.

Regarding the active metal content in Catalyst-74, the molybdenum content was 15% by weight as $MoO_3$ and the cobalt content was 4% by weight as CoO. The amount of 4-mercaptophenol used contained 1.5 times the theoretical amount of sulfur necessary to convert Mo and Co into $MoS_2$ and CoS, respectively.

The desulfurization percentage with Catalyst-74 was 84.0%.

EXAMPLE 75: (Method IV)

Catalyst-75 was prepared in the same manner as Example 5, except that 47.3 g of ethanedithiol was used as the sulfurizing agent.

The breaking strength of Catalyst-75 was 1.5 kg/mm or more.

Regarding the active metal content in Catalyst-75, the molybdenum content was 15% by weight as $MoO_3$, the cobalt content was 4% by weight as CoO and the phosphorus content was 3% by weight as $P_2O_5$. The amount of ethanedithiol used contained 1.5 times the theoretical amount of sulfur necessary to convert Mo and Co into $MoS_2$ and CoS, respectively.

The desulfurization percentage with Catalyst-75 was 87.0%.

EXAMPLE 76: (Method IV)

Catalyst-76 was prepared in the same manner as Example 8, except that 61.4 g of 1,4-butanedithiol was used as the sulfurizing agent.

The breaking strength of Catalyst-76 was 1.5 kg/mm or more.

Regarding the active metal content in Catalyst-76, the molybdenum content was 15% by weight as $MoO_3$, the cobalt content was 4% by weight and the phosphorus content was 3% by weight as $P_2O_5$. The amount of 1,4-butanedithiol used contained 1.5 times the theoretical amount of sulfur necessary to convert Mo and Co into $MoS_2$ and CoS, respectively.

The desulfurization percentage with Catalyst-76 was 86.3%.

EXAMPLE 77: (Method IV)

Catalyst-77 was prepared in the same manner as Example 9, except that 78.6 g of 2-mercaptoethanol was used as the sulfurizing agent.

The breaking strength of Catalyst-77 was 1.5 kg/mm or more.

Regarding the active metal content in Catalyst-77, the molybdenum content was 15% by weight as $MoO_3$, the cobalt content was 4% by weight as CoO and the phosphorus content was 3% by weight as $P_2O_5$. The amount of 2-mercaptoethanol used contained 1.5 times the theoretical amount of sulfur necessary to convert Mo and Co into $MoS_2$ and CoS, respectively.

The desulfurization percentage with Catalyst-77 was 88.0%.

EXAMPLE 78: (Method IV)

Catalyst-78 was prepared in the same manner as Example 5, except that 126.9 g of 4-mercaptophenol was used as the sulfurizing agent.

The breaking strength of Catalyst-78 was 1.5 kg/mm or more.

Regarding the active metal content in Catalyst-78, the molybdenum content was 15% by weight as $MoO_3$, the cobalt content was 4% by weight as CoO and the phosphorus content was 3% by weight as $P_2O_5$. The amount of 4-mercaptophenol used contained 1.5 times the theoretical amount of sulfur necessary to convert Mo and Co into $MoS_2$ and CoS, respectively.

The desulfurization percentage with Catalyst-78 was 84.8%.

EXAMPLE 79: (Method IV)

Catalyst-79 was prepared in the same manner as Example 8, except that 108.9 g of 3-mercapto-1,2-propanediol was used as the sulfurizing agent.

The breaking strength of Catalyst-79 was 1.5 kg/mm or more.

Regarding the active metal content in Catalyst-79, the molybdenum content was 15% by weight as $MoO_3$, the cobalt content was 4% by weight as CoO and the phosphorus content was 3% by weight as $P_2O_5$. The amount of 3-mercapto-1,2-propanediol used contained 1.5 times the theoretical amount of sulfur necessary to convert Mo and Co into $MoS_2$ and CoS, respectively.

The desulfurization percentage with Catalyst-79 was 85.0%.

EXAMPLE 80: (Method IV)

Catalyst-80 was prepared in the same manner as Example 12, except that 67.2 g of ethanedithiol was used as the sulfurizing agent.

The breaking strength of Catalyst-80 was 1.5 kg/mm or more.

Regarding the active metal content in Catalyst-80, the molybdenum content was 20% by weight as $MoO_3$, the nickel content was 4% by weight as NiO and the phosphorus content was 6.5% by weight as $P_2O_5$. The amount of ethanedithiol used contained 1.5 times the theoretical amount of sulfur necessary to convert Mo and Ni into $MoS_2$ and NiS, respectively.

The desulfurization percentage with Catalyst-80 was 83.7%.

EXAMPLE 81: (Method IV)

Catalyst-81 was prepared in the same manner as Example 12, except that 111.6 g of 2-mercaptoethanol was used as the sulfurizing agent.

The breaking strength of Catalyst-81 was 1.5 kg/mm or more.

Regarding the active metal content in Catalyst-81, the molybdenum content was 20% by weight as $MoO_3$, the nickel content was 4% by weight as NiO and the phosphorus content was 6.5% by weight as $P_2O_5$. The amount of 2-mercaptoethanol used contained 1.5 times the theoretical amount of sulfur necessary to convert Mo and Ni into $MoS_2$ and NiS, respectively.

The desulfurization percentage with Catalyst-81 was 82.0%.

EXAMPLE 82: (Method IV)

Catalyst-82 was obtained in the same manner as Example 8, except that 126.9 g of 4-mercaptophenol was used as the sulfurizing agent.

The breaking strength of Catalyst-82 was 1.5 kg/mm or more.

Regarding the active metal content in Catalyst-82, the molybdenum content was 15% by weight as $MoO_2$, the cobalt content was 4% by weight as CoO and the phosphorus content was 3% by weight as $P_2O_5$. The amount of 4-mercaptophenol used contained 1.5 times the theoretical amount of sulfur necessary to convert Mo and Co into $MoS_2$ and CoS, respectively.

The desulfurization percentage with Catalyst-82 was 86.7%.

EXAMPLE 83: (Method IV)

Catalyst-83 was prepared in the same manner as Example 8, except that 78.6 g of 2-mercaptoethanol was used as the sulfurizing agent.

The breaking strength of Catalyst-83 was 1.5 kg/mm or more.

Regarding the active metal content in Catalyst-83, the molybdenum content was 15% by weight as $MoO_3$, the cobalt content was 4% by weight as CoO and the phosphorus content was 3% by weight as $P_2O_5$. The amount of 2-mercaptoethanol used contained 1.5 times the theoretical amount of sulfur necessary to convert Mo and Co into $MoS_2$ and CoS, respectively.

The desulfurization percentage with Catalyst-83 was 87.6%.

EXAMPLE 84: (Method IV)

Catalyst-84 was prepared in the same manner as Example 8, except that 47.3 g of ethanedithiol was used as the sulfurizing agent.

The breaking strength of Catalyst-84 was 1.5 kg/mm or more.

Regarding the active metal content in Catalyst-84, the molybdenum content was 15% by weight as $MoO_3$, the cobalt content was 4% by weight as CoO and the phosphorus content was 3% by weight as $P_2O_5$. The amount of ethanedithiol used contained 1.5 times the theoretical amount of sulfur necessary to convert Mo and Co into $MoS_2$ and CoS, respectively.

The desulfurization percentage with Catalyst-84 was 89.5%.

EXAMPLE 85: (Method V)

Catalyst-85 was prepared in the same manner as Example 13, except that 47.3 g of ethanedithiol was used as the sulfurizing agent.

The breaking strength of Catalyst-85 was 1.5 kg/mm or more.

Regarding the active metal content in Catalyst-85, the molybdenum content was 15% by weight as $MoO_3$, the cobalt content was 4% by weight as CoO and the phosphorus content was 3% by weight as $P_2O_5$. The amount of ethanedithiol used contained 1.5 times the theoretical amount of sulfur necessary to convert Mo and Co into $MoS_2$ and CoS, respectively.

The desulfurization percentage with Catalyst-85 was 88.0%.

EXAMPLE 86: (Method V)

Catalyst-86 was prepared in the same manner as Example 13, except that 78.6 g of 2-mercaptoethanol was used as the sulfurizing agent.

The breaking strength of Catalyst-86 was 1.5 kg/mm or more.

Regarding the active metal content in Catalyst-86, the molybdenum content was 15% by weight as $MoO_3$, the cobalt content was 4% by weight as CoO and the phosphorus content was 3% by weight as $P_2O_5$. The amount of 2-mercaptoethanol used contained 1.5 times the theoretical amount of sulfur necessary to convert Mo and Co into $MoS_2$ and CoS, respectively.

The desulfurization percentage with Catalyst-86 was 85.0%.

EXAMPLE 87: (Method VI)

Catalyst-87 was prepared in the same manner as Example 14, except that 61.4 g of 4-butanedithiol was used as the sulfurizing agent.

The breaking strength of Catalyst-87 was 1.5 kg/mm or more.

Regarding the active metal content in Catalyst-87, the molybdenum content was 15% by weight as $MoO_3$, the cobalt content was 4% by weight as CoO and the phosphorus content was 3% by weight as $P_2O_5$. The amount of 4-butanedithiol used contained 1.5 times the theoretical amount of sulfur necessary to convert Mo and Co into $MoS_2$ and CoS, respectively.

The desulfurization percentage with Catalyst-87 was 85.3%.

EXAMPLE 88: (Method VII)

Catalyst-88 was prepared in the same manner as Example 15, except that 108.9 g of 3-mercapto-1,2-propanediol was used as the sulfurizing agent.

The breaking strength of Catalyst-88 was 1.5 kg/mm or more.

Regarding the active metal content in Catalyst-88, the molybdenum content was 15% by weight as $MoO_3$, the cobalt content was 4% by weight as CoO and the phosphorus content was 3% by weight as $P_2O_5$. The amount of 3-mercapto-1,2-propanediol used contained 1.5 times the theoretical amount of sulfur necessary to convert Mo and Co into $MoS_2$ and CoS, respectively.

The desulfurization percentage with Catalyst-88 was 83.8%.

EXAMPLE 89: (Method VIII)

Catalyst-89 was obtained in the same manner as Example 16, except that 126.9 g of 4-mercaptophenol was used as the sulfurizing agent.

The breaking strength of Catalyst-89 was 1.5 kg/mm or more.

Regarding the active metal content in Catalyst-89, the molybdenum content was 15% by weight as $MoO_3$, the cobalt content was 4% by weight as CoO and the phosphorus content was 3% by weight as $P_2O_5$. The amount of 4-mercaptophenol used contained 1.5 times the theoretical amount of sulfur necessary to convert Mo and Co into $MoS_2$ and CoS, respectively.

The desulfurization percentage with Catalyst-89 was 84.8%.

EXAMPLE 90: (Method IX)

Catalyst-90 was prepared in the same manner as Example 17, except that 78.6 g of 2-mercaptoethanol was used as the sulfurizing agent.

The breaking strength of Catalyst-90 was 1.5 kg/mm or more.

Regarding the active metal content in Catalyst-90, the molybdenum content was 15% by weight as $MoO_3$, the cobalt content was 4% by weight as CoO and the phosphorus content was 3% by weight as $P_2O_5$. The amount of 2-mercaptoethanol used contained 1.5 times the theoretical amount of sulfur necessary to convert Mo and Co into $MoS_2$ and CoS, respectively.

The desulfurization percentage with Catalyst-90 was 84.5%.

EXAMPLE 91: (Method X)

Catalyst-91 was prepared in the same manner as Example 18, except that 47.3 g of ethanedithiol was used as the sulfurizing agent.

The breaking strength of Catalyst-91 was 1.5 kg/mm or more.

Regarding the active metal content in Catalyst-91, the molybdenum content was 15% by weight as $MoO_3$, the cobalt content was 4% by weight as CoO and the phosphorus content was 3% by weight as $P_2O_5$. The amount of ethanedithiol used contained 1.5 times the theoretical amount of sulfur necessary to convert Mo and Co into $MoS_2$ and CoS, respectively.

The desulfurization percentage with Catalyst-91 was 87.0%.

COMPARATIVE EXAMPLE 1:

A commercial catalyst comprising 15 wt. % of $MoO_3$ and 4 wt. % of CoO as carried on $\gamma$-alumina (KF-742, commercial product by Nippon Ketjen Co.) was prepared.

The catalyst was presulfurized in accordance with the following conditions:
Sulfurizing Oil:
  3 wt. % n-butylmercaptan/Kuwait Straight-run light gas oil
Amount of Catalyst:
  3 ml
Raw Material Oil Liquid Hourly Space Velocity:
  2.0 $hr^{-1}$
Reaction Pressure (Hydrogen Pressure):
  30 $kg/cm^2$
Reaction Temperature:
  316° C.
Hydrogen/Oil Ratio:
  300 N liter/liter
Oil Passing Time:
  8 hr.

The activity of the thus-presulfurized catalyst was evaluated in the same manner as in the above-mentioned examples. As a result, the desulfurization percentage was 82.4%.

COMPARATIVE EXAMPLE 2:

100 g of shaped $\gamma$-alumina carrier having a relative surface area of 280 $m^2/g$ and a pore volume of 0.75 ml/g was impregnated with 80 ml of a processing liquid prepared from 19.2 g of molybdenum trioxide, 8.2 g of cobalt carbonate having Co-content of 49.1 wt. %, 6.2 g of 85 wt. % phosphoric acid and water and dried at 110° C. for 16 hours and thereafter fired at 500° C. for 2 hours. Accordingly, a catalyst containing 15% by weight of MoO$_3$, 4% by weight of CoO and 3% by weight of P$_2$O$_5$ was obtained.

The catalyst was presulfurized in the same manner as in the above-mentioned Comparative Example 1 and the activity of the thus-presulfurized catalyst was evaluated in the same manner as in the above-mentioned examples. As a result, the desulfurization percentage was 80.4%.

It takes about 8 hours or so to presulfurize the conventional catalysts. In the case of the catalyst disclosed in the above-mentioned Japanese Patent Publication No. 61-111144, it must be fired for at least 1 hour after it was impregnated with a sulfurizing agent. On the other hand, the catalysts of the present invention require neither presulfurization nor firing and can directly be applied to hydrotreatment, as they are prepared by the use of an organic compound having one or two sulfurs as a sulfurizing agent. Accordingly, the catalysts of the present invention are more economical than the conventional catalysts.

While the invention has been described in detail and with reference to specific embodiments thereof, it will be apparent to one skilled in the art that various changes and modifications can be made therein without departing from the spirit and scope thereof.

What is claimed is:

1. A catalyst for hydrotreating hydrocarbons, which comprises a shaped body of a mixture composed of a carrier substance consisting essentially of an oxide of aluminium and/or an oxide hydrate of aluminium, at least one compound selected from water-soluble compounds of metals of Group VI and Group VIII of the Periodic Table and at least one organic compound selected from the group consisting of mercapto-carboxylic acids of a general formula:

$$HS-(CH_2)_n-COOR$$

where n represents an integer of from 1 to 3; and R represents a hydrogen atom, or an alkali metal, an alkaline earth metal, an ammonium group, or an alkyl group having from 1 to 10 carbon atoms,
thio-acids of a general formula:

$$R'-COSH$$

where R' represents a monovalent hydrocarbon group having form 1 to 15 carbon atoms,
amino-substituted mercaptans of a general formula:

$$H_2N-R''-SH$$

where R'' represents a divalent hydrocarbon group having from 1 to 15 carbon atoms,
dimercaptans of a general formula:

$$HS-R''-HS$$

where R'' represents a divalent hydrocarbon group having from 1 to 15 carbon atoms, and mercapto-alcohols of a general formula:

$$R^aS-R'''-(OH)_n$$

where R''' represents an alkyl group having form 1 to 15 carbon atoms, or a phenyl group; R$^a$ represents a hydrogen atom or an alkyl group having from 1 to 2 carbon atoms; and n represents an integer of from 1 to 2.

2. The catalyst for hydrotreating hydrdocarbons as claimed in claim 1, in which the oxide of aluminium and/or oxide hydrate of aluminium constituting the carrier substance is at least one compound selected from the group consisting of γ-alumina, dehydrated boehmite and spray-dried boehmite.

3. The catalyst for hydrotreating hydrocarbons as claimed in claim 1, in which the water-soluble compounds of metals of Group VI of the Periodic Table are at least one compound selected from ammonium molybdate and ammonium tungstate, and the water-soluble compounds of metals of Group VIII of the Periodic Table are at least one compound selected from the group consisting of cobalt nitrate, cobalt carbonate, nickel nitrate and nickel carbonate; the mixture constituting the shaped body containing at least one compound selected from said water-soluble compounds.

4. The catalyst for hydrotreating hydrocarbons as claimed in claim 1, in which the mercapto-carboxylic acids of a general formula:

$$SH-(CH_2)_n-COOR$$

where n represents an integer of from 1 to 3; and R represents a hydrogen atom, or an alkali metal, an alkaline earth metal, an ammonium group, or an alkyl group having from 1 to 10 carbon atoms, are at least one compound selected from mercapto-acetic acid and β-mercapto-propionic acid and alkali metal salts, alkaline earth metal salts and ammonium salts thereof and methyl mercapto-acetate, ethyl 2-mercapto-acetate, 2-ethylhexyl mercapto-acetate and methyl 3-mercapto-propionate.

$$SH-(CH_2)_n-COOR$$

where n represents an integer of from 1 to 3; and R represents a hydrogen atom, or an alkali metal, an alkaline earth metal, an ammonium group, or an alkyl group having from 1 to 10 carbon atoms, are at least one compound selected from mercapto-acetic acid and β-mercapto-propionic acid and alkali metal salts, alkaline earth metal salts and ammonium salts thereof and methyl mercapto-acetate, ethyl 2-mercapto-acetate, 2-ethylhexyl mercapto-acetate and methyl 3-mercapto-propionate.

5. The catalyst for hydrotreating hydrocarbons as claimed in claim 1, in which the thio-acids of a general formula:

$$R'-COSH$$

where R' represents a monovalent hydrocarbon group having from 1 to 15 carbon atoms, are at least one acid selected from thioacetic acid and thio-benzoic acid.

6. The catalyst for hydrotreating hydrocarbons as claimed in claim 1, in which the amino-substituted mercaptans of a general formula:

$$H_2N-R''-SH$$

where R'' represents a divalent hydrocarbon group having from 1 to 15 carbon atoms, are at least one compound selected from 2-aminoethanethiol and 4-aminothiophenol.

7. The catalyst for hydrotreating hydrocarbons as claimed in claim 1, in which the dimercaptans of a general formula:

HS—R"—SH where R" represents a divalent hydrocarbon group having from 1 to 15 carbon atoms, are at least one compound selected from ethanedithiol and 1,4-butanedithiol.

8. The catalyst for hydrotreating hydrocarbons as claimed in claim 1, in which the mercapto-alcohols of a general formula:

$R^a$S—R'''—(OH)$_n$ where R''' represents an alkyl group having from 1 to 15 carbon atoms or a phenyl group; $R^a$ represents a hydrogen atom or an alkyl group having from 1 to 2 carbon atoms; and n represents an integer of from 1 to 2, are at least one compound selected from 2-mercaptoethanol, 2-(methylthio)ethanol, 2-(ethylthio)ethanol, 3-mercapto-2-butanol, 4-mercaptophenol, 2-(methylthio)phenol, 4-(methylthio)phenol, 2-(ethylthio)phenol, 3-mercapto-1,2-propanediol, 3-methylthio-1,2-propanediol and 3-ethylthio-1,2-propanediol.

9. The catalyst for hydrotreating hydrocarbons as claimed in claim 1, in which the content of the metals of the Groups VI and VIII of the Periodic Table is from 1 to 30% by weight as the metal oxide when the catalyst contains one metal of one of said Groups, or the content of the metal of Group VI is from 5 to 30% by weight as the metal oxide and that of the metal of Group VIII is from 1 to 8% by weight as the metal oxide when the catalyst contains both the metals of Groups VI and VIII.

10. A method for preparing a catalyst for hydrotreating hydrocarbons, which is characterized in that a carrier substance consisting essentially of an oxide of aluminium and/or an oxide hydrate of aluminium is blended and kneaded with a solution containing at least one compound selected from water-soluble compounds of metals of Group VI and Group VIII of the Periodic Table and at least one organic compound selected from the group consisting of mercapto-carboxylic acids of a general formula:

HS—(CH$_2$)$_n$—COOR where n represents an integer of from 1 to 3; and R represents a hydrogen atom, or an alkali metal, an alkaline earth metal, an ammonium group, or an alkyl group having from 1 to 10 carbon atoms, thio-acids of a general formula:

R'—COSH where R' represents a monovalent/hydrocarbon group having from 1 to 15 carbon atoms, amino-substituted mercaptans of a general formula:

H$_2$N—R"—SH where R" represents a divalent hydrocarbon group having from 1 to 15 carbon atoms, dimercaptans of a general formula:

HS—R"—SH where R" represents a divalent hydrocarbon group having from 1 to 15 carbon atoms, and mercapto-alcohols of a general formula:

$R^a$S—R'''—(OH)$_n$ where R''' represents an alkyl group having from 1 to 15 carbon atoms or a phenyl group; $R^a$ represents a hydrogen atom or an alkyl group having from 1 to 2 carbon atoms; and n represents an integer of from 1 to 2, and the resulting blend is shaped and dried to prepare said catalyst.

11. A method for preparing a catalyst for hydrotreating hydrocarbons, wherein a carrier substance consisting essentially of an oxide of aluminium and/or an oxide hydrate of aluminium is blended and kneaded with an aqueous solution of at least one compound selected from water-soluble compounds of metals of Group VI and Group VIII of the Periodic Table, the resulting blend is shaped and then temporarily dried, and the thus dried shaped body is impregnated with a solution of at least one organic compound selected from the group consisting of mercapto-carboxylic acids of a general formula:

HS—(CH$_2$)$_n$—COOR where n represents an integer of from 1 to 3; and R represents a hydrogen atom, or an alkali metal, an alkaline earth metal, an ammonium group, or an alkyl group having from 1 to 10 carbon atoms, thio-acids of a general formula:

R'—COSH where R' represents a monovalent hydrocarbon group having from 1 to 15 carbon atoms, amino-substituted mercaptans of a general formula:

H$_2$N—R"—SH where R" represents a divalent hydrocarbon group having from 1 to 15 carbon atoms, dimercaptans of a general formula:

HS—R"—SH where R" represents a divalent hydrocarbon group having from 1 to 15 carbon atoms, and mercapto-alcohols of a general formula:

$R^a$S—R'''—(OH)$_n$ where R''' represents an alkyl group having from 1 to 15 carbon atoms or a phenyl group; $R^a$ represents a hydrogen atom or an alkyl group having from 1 to 2 carbon atoms; and n represents an integer of from 1 to 2, and then again dried to prepare said catalyst.

12. A method for preparing a catalyst for hydrotreating hydrocarbon, which is characterized in that a carrier substance consisting essentially of an oxide of aluminium and/or an oxide hydrate of aluminium is blended and kneaded with an aqueous solution of at least one organic compound selected from the group consisting of mercapto-carboxylic acids of a general formula:

HS—(CH$_2$)$_n$—COOR where n represents an integer of from 1 to 3; and R represents a hydrogen atom, an alkali metal, an alkaline earth metal, an ammonium group, or an alkyl group having from 1 to 10 carbon atoms, thio-acids of a general formula:

R'—COSH where R' represents a monovalent hydrocarbon group having from 1 to 15 carbon atoms,
amino-substituted mercaptans of a general formula:

H₂N—R"—SH where R" represents a divalent hydrocarbon group having from 1 to 15 carbon atoms,
dimercaptans of a general formula:

HS—R"—SH where R" represents a divalent hydrocarbon group having from 1 to 15 carbon atoms, and
mercapto-alcohols of a general formula:

RᵃS—R'"—(OH)ₙ where R'" represents an alkyl group having from 1 to 15 carbon atoms or a phenyl group; Rᵃ represents a hydrogen atom or an alkyl group having from 1 to 2 carbon atoms; and n represents an integer of from 1 to 2,
the resulting blend is shaped and then temporarily dried, and the thus dried shaped body is impregnated with an aqueous solution of at least one compound selected from water-soluble compounds of metals of Group VI and Group VIII of the Periodic Table, and then again dried to prepare the said catalyst.

13. The method for preparing a catalyst for hydrogenation of hydrocarbons as claimed in any one of claims 10 to 12, in which the oxide of aluminium and/or oxide hydrate of aluminium constituting the carrier substance is at least one compound selected from the group consisting of γ-alumina, dehydrated boehmite and spray-dried boehmite.

14. The method for preparing a catalyst for hydrotreating hydrocarbons as claimed in any one of claims 10 to 12, in which the water-soluble compounds of metals of Group VI of the Periodic Table are at least one compound selected from ammonium molybdate and ammonium tungstate, and the water-soluble compounds of metals of Group VIII of the Periodic Table are at least one compound selected from the group consisting of cobalt nitrate, cobalt carbonate, nickel nitrate and nickel carbonate; said aqueous solution containing at least one compound selected from said water-soluble compounds.

15. The method for preparing a catalyst for hydrotreating hydrocarbons as claimed in any one of claims 10 to 12, in which the mercapto-carboxylic acids of a general formula:

HS—(CH₂)ₙ—COOR where n represents an integer of from 1 to 3; and R represents a hydrogen atom, or an alkali metal, an alkaline earth metal, an ammonium group, or an alkyl group having from 1 to 10 carbon atoms, are at least one compound selected from mercapto-acetic acid and β-mercapto-propionic acid and alkali metal salts, alkaline earth metal salts and ammonium salts thereof and methyl mercapto-acetate, ethyl 2-mercapto-acetate, 2-ethylhexyl mercapto-acetate and methyl 3-mercapto-propionate.

16. The method for preparing a catalyst for hydrotreating hydrocarbons as claimed in any one of claims 10 to 12, in which the thio-acids of a general formula:

R'—COSH where R' represents a monovalent hydrocarbon group having from 1 to 15 carbon atoms, are at least one acid selected from thioacetic acid and thio-benzoic acid.

17. The method for preparing a catalyst for hydrotreating hydrocarbons as claimed in any one of claims 10 to 12, in which the amino-substituted mercaptans of a general formula:

H₂N—R"—SH where R" represents a divalent hydrocarbon group having from 1 to 15 carbon atoms, are at least one compound selected from 2-aminoethanethiol and 4-aminothiophenol.

18. The method for preparing a catalyst for hydrotreating hydrocarbons as claimed in any one of claims 10 to 12, in which the dimercaptans of a general formula:

HS—R"—SH where R" represents a divalent hydrocarbon group having from 1 to 15 carbon atoms, are at least one compound selected from ethanedithiol and 1,4-butanedithiol.

19. The method for preparing a catalyst for hydrotreating hydrocarbons as claimed in any one of claims 10 12, in which the mercapto-alcohols of a general formula:

RᵃS—R'"—(OH)ₙ where R'" represents an alkyl group having from 1 to 15 carbon atoms or a phenyl group; Rᵃ represents a hydrogen atom or an alkyl group having from 1 to 2 carbon atoms; and n represents an integer of from 1 to 2, are at least one compound selected from 2-mercaptoethanol, 2-(methylthio)ethanol, 2-(ethylthio)ethanol, 3-mercapto-2-butanol, 4-mercaptophenol, 2-(methylthio)phenol, 4-(methylthio)phenol, 2-(ethylthio)phenol, 3-mercapto-1,2-propanediol, 3-methylthio-1,2-propanediol and 3-ethylthio-1,2-propanediol.

20. The method for preparing a catalyst for hydrotreating hydrocarbons as claimed in any one of claims 10 to 12, in which the content of the metals of Groups VI and VIII of the Periodic Table in the catalyst is from 1 to 30% by weight as the metal oxide when the catalyst contains one metal of one of said Groups, or the content of the metal of Group VI in the catalyst is from 5 to 30% by weight as the metal oxide and that of the metal of Group VIII therein is from 1 to 8% by weight as the metal oxide when the catalyst contains both the metals of Groups VI and VIII.

21. The method for preparing a catalyst for hydrotreating hydrocarbons as claimed in any one of claims 10 to 12, in which the amount of the mercapto-carboxylic acids and other sulfurizing agents is from 1 to 3 equivalent times of the amount of the sulfur necessary for forming sulfides of the metals of Groups VI and VIII of the Periodic Table, said sulfides being high active in hydrogenation reaction.

22. The method for preparing a catalyst for hydrotreating hydrocarbons as claimed in any one of claims 10 to 12, in which the drying temperature falls within the range of 50° to 200° C. and the drying time falls within the range of 2 to 20 hours.

23. A catalyst for hydrotreating hydrocarbons, which comprises a shaped body of a mixture composed of a carrier substance consisting essentially of an oxide of aluminium and/or an oxide hydrate of aluminium, at least one compounds selected from water-soluble compounds of metals of Group VI and Group VIII of the Periodic Table, phosphoric acid and at least one organic compound selected from the group consisting of mercapto-carboxylic acids of a general formula:

HS—(CH$_2$)$_n$—COOR where n represents an integer of from 1 to 3; and R represents a hydrogen atom, or an alkali metal, an alkaline earth metal, an ammonium group, or an alkyl group having from 1 to 10 carbon atoms,
thio-acids of a general formula:

R'—COSH where R' represents a monovalent hydrocarbon group having from 1 to 15 carbon atoms,
amino-substituted mercaptans of a general formula:

H$_2$N—R''—SH where R'' represents a divalent hydrocarbon group having from 1 to 15 carbon atoms,
dimercaptans of a general formula:

HS—R''—SH where R'' represents a divalent hydrocarbon group having from 1 to 15 carbon atoms, and
mercapto-alcohols of a general formula:

R$^a$S—R'''—(OH)$_n$ where R''' represents an alkyl group having from 1 to 15 carbon atoms, or a phenyl group; R$^a$ represents a hydrogen atom or an alkyl group having from 1 to 2 carbon atoms; and n represents an integer of from 1 to 2.

24. The catalyst for hydrotreating hydrocarbons as claimed in claim 23, in which the oxide of aluminium and/or oxide hydrate of aluminium constituting the carrier substance is(are) at least one compound selected from the group consisting of γ-alumina, dehydrated boehmite and spray-dried boehmite.

25. The catalyst for hydrotreating hydrocarbons as claimed in claim 23, in which the water-soluble compounds of metals of Group VI of the Periodic Table are at least one compound selected from annomium molybdate and ammonium tungstate, and the water-soluble compounds of metals of Group VIII of the Periodic Table are at least one compound selected from the group consisting of cobalt nitrate, cobalt carbonate, nickel nitrate and nickel carbonate; the mixture constituting the shaped body containing at least one compound selected from said water-soluble compounds.

26. The catalyst for hydrotreating hydrocarbons as claimed in claim 23, in which the mercapto-carboxylic acids of a general formula:

HS—(CH$_2$)$_n$—COOR where n represents an integer of from 1 to 3; and R represents a hydrogen atom, or an alkali metal, an alkaline earth metal, an ammonium group, an alkyl group having from 1 to 10 carbon atoms, are at least one compound selected from mercapto-acetic acid and β-mercapto-propionic acid and alkali metal salts, alkaline earth metal salts and ammonium salts thereof and methyl mercapto-acetate, ethyl 2-mercapto-acetate, 2-ethylhexyl mercapto-acetate and methyl 3-mercapto-propionate.

27. The catalyst for hydrotreating hydrocarbons as claimed in claim 23, in which the thio-acids of a general formula:

R'—COSH where R' represents a monovalent hydrocarbon group having from 1 to 15 carbon atoms, are at least one acid selected from thioacetic acid and thio-benzoic acid.

28. The catalyst for hydrotreating hydrocarbons as claimed in claim 23, in which the amino-substituted mercaptans of a general formula:

H$_2$N—R''—SH where R'' represents a divalent hydrocarbon group having from 1 to 15 carbon atoms, are at least one compound selected from 2-aminoethanethiol and 4-aminothiophenol.

29. The catalyst for hydrotreating hydrocarbons as claimed in claim 23, in which the dimercaptans of a general formula:

HS—R''—SH where R'' represents a divalent hydrocarbon group having from 1 to 15 carbon atoms, are at least one compound selected from ethanedithiol and 1,4-butanedithiol.

30. The catalyst for hydrotreating hydrocarbons as claimed in claim 23, in which the mercapto-alcohols of a general formula:

R$^a$S—R'''—(OH)$_n$ where R''' represents an alkyl group having from 1 to 15 carbon atoms or a phenyl group; R$^a$ represents a hydrogen atom or an alkyl group having from 1 to 2 carbon atoms; and n represents an integer of from 1 to 2, are at least one compound selected from 2-mercaptoethanol, 2-(methylthio)ethanol, 2-(ethylthio)ethanol, 3-mercapto-2-butanol, 4-mercaptophenol, 2-(methylthio)phenol, 4-(methylthio)phenol, 2-(ethylthio)phenol, 3-mercapto-1,2-propanediol, 3-methylthio-1,2-propanediol and 3-ethylthio-1,2-propanediol.

31. The catalyst for hydrotreating hydrocarbons as claimed in claim 23, in which the content of the metals of the Groups VI and VIII of the Periodic Table is from 1 to 30% by weight as the metal oxide when the catalyst contains one metal of, or the content of the metal of Group VI is form 5 to 30% by weight as the metal oxide and that of the metal of Group VIII is from 1 to 8% by weight as the metal oxide when the catalyst contains both the metals of Group VI and VIII.

32. A method for preparing a catalyst for hydrotreating hydrocarbons, wherein a carrier substance consisting essentially of an oxide of aluminium and/or an oxide hydrate of aluminium is blended and kneaded with a solution containing at least one compound selected from water-soluble compounds of metals of Group VI and Group VIII of the Periodic Table, phosphoric acid and at least one organic compound selected from the group consisting of mercapto-carboxylic acids of a general formula:

HS—(CH$_2$)$_n$—COOR where n represents an integer of from 1 to 3; and R represents a hydrogen atom, or an alkali metal, an alkaline earth metal, an ammonium group, or an alkyl group having from 1 to 10 carbon atoms, thio-acids of a general formula:

R'—COSH where R' represents a monovalent hydrocarbon group having from 1 to 15 carbon atoms,
amino-substituted mercaptans of a general formula:

H$_2$N—R''—SH where R'' represents a monovalent hydrocarbon group having from 1 to 15 carbon atoms,
dimercaptans of a general formula:

HS—R''—SH where R'' represents a divalent hydrocarbon group having from 1 to 15 carbon atoms, and
mercapto-alcohols of a general formula:

R$^a$S—R'''—(OH)$_n$ where R''' represents an alkyl group having from 1 to 15 carbon atoms or a phenyl group; R$^a$ represents a hydrogen atom or an alkyl group having from 1 to 2 carbon atoms; and n represents an integer of from 1 to 2,
and the resulting blend is shaped and dried to prepare said catalyst.

33. A method for preparing a catalyst for hydrotreating hydrocarbons, wherein a carrier substance consisting essentially of an oxide of aluminium and/or an oxide hydrate of aluminium is blended and kneaded with an aqueous solution comprising at least one compound selected from water-soluble compounds of metals of Group VI and Group VIII of the Periodic Table and phosphoric acid, the resulting blend is shaped and then temporarily dried, and the thus dried, shaped body is impregnated with a solution of at least one organic compound selected from the group consisting of mercapto-carboxylic acids of a general formula:

HS—(CH$_2$)$_n$—COOR where n represents an integer of from 1 to 3; and R represents a hydrogen atom, or an alkali metal, an alkaline earth metal, an ammonium group, or an alkyl group having from 1 to 10 carbon atoms, thio-acids of a general formula:

R'—COSH where R' represents a monovalent hydrocarbon group having from 1 to 15 carbon atoms,
amino-substituted mercaptans of a general formula:

H$_2$N—R''—SH where R'' represents a divalent hydrocarbon group having from 1 to 15 carbon atoms,
dimercaptans of a general formula:

HS—R''—SH where R'' represents a divalent hydrocarbon group having from 1 to 15 carbon atoms, and
mercapto-alcohols of a general formula:

R$^a$S—R'''—(OH)$_n$ where R''' represents an alkyl group having from 1 to 15 carbon atoms or a phenyl group; R$^a$ represents a hydrogen atom or an alkyl group having from 1 to 2 carbon atoms; and n represents an integer of from 1 to 2,
and then again dried to prepare said catalyst.

34. A method for preparing a catalyst for hydrotreating hydrocarbons, wherein a carrier substance consisting essentially of an oxide of aluminium and/or an oxide hydrate of aluminium is blended and kneaded with an aqueous solution comprising at least one compound selected from water-soluble compounds of metals of Group VI and Group VIII of the Periodic Table and at least one organic compound selected from the group consisting of mercapto-carboxylic acids of a general formula:

HS—(CH$_2$)$_n$—COOR where n represents an integer of from 1 to 3; and R represents a hydrogen atom, or an alkali metal, an alkaline earth metal, an ammonium group, or an alkyl group having from 1 to 10 carbon atoms, thio-acids of a general formula:

R'—COSH where R' represents a monovalent hydrocarbon group having from 1 to 15 carbon atoms,
amino-substituted mercaptans of a general formula:

H$_2$N—R''—SH where R'' represents a divalent hydrocarbon group having from 1 to 15 carbon atoms,
dimercaptans of a general formula:

HS—R''—SH where R'' represents a divalent hydrocarbon group having from 1 to 15 carbon atoms, and
mercapto-alcohols of a general formula:

R$^a$S—R'''—(OH)$_n$ where R''' represents an alkyl group having from 1 to 15 carbon atoms or a phenyl group; R$^a$ represents a hydrogen atom or an alkyl group having from 1 to 2 carbon atoms; and n represents an integer of from 1 to 2, the resulting blend is shaped and temporarily dried, and the thus dried, shaped body is impregnated with an aqueous solution of phosphoric acid, and then again dried to prepare said catalyst.

35. A method for preparing a catalyst for hydrotreating hydrocarbons, wherein a carrier substance consisting essentially of an oxide of aluminium and/or an oxide hydrate of aluminium is blended and kneaded with a solution comprising phosphoric acid and at least one compound selected from the group consisting of mercapto-carboxylic acids of a general formula:

HS—(CH$_2$)$_n$—COOR where n represents an integer of from 1 to 3; and R represents a hydrogen atom, or an alkali metal, an alkaline earth metal, an ammonium group, or an alkyl group having from 1 to 10 carbon atoms,
thio-acids of a general formula:

R'—COSH where R' represents a monovalent hydrocarbon group having from 1 to 15 carbon atoms,
amino-substituted mercaptans of a general formula:

H$_2$N—R''—SH where R'' represents a divalent hydrocarbon group having from 1 to 15 carbon atoms,
dimercaptans of a general formula:

HS—R''—SH where R'' represents a divalent hydrocarbon group having from 1 to 15 carbon atoms, and
mercapto-alcohols of a general formula:

R$^a$S—R'''—(OH)$_n$ where R''' represents an alkyl group having from 1 to 15 carbon atoms or a phenyl group; R$^a$ represents a hydrogen atom or an alkyl group having from 1 to 2 carbon atoms; and n represents an integer of from 1 to 2, the resulting blend is shaped and temporarily dried, and the thus dried, shaped body is impregnated with an aqueous solution containing at least one compound selected from water-soluble compounds of metals of Group VI and Group VIII of the Periodic Table, and then again dried to prepare said catalyst.

36. A method for preparing a catalyst for hydrotreating hydrocarbons, wherein a carrier substance consisting essentially of an oxide of aluminium and/or an oxide hydrate of aluminium is blended and kneaded with an aqueous solution comprising at least one compound selected from water-soluble compounds of metals of Group VI and Group VIII of the Periodic Table, the resulting blend is shaped and temporarily dried, and the thus dried, shaped body is impregnated with a solution of comprising phosphoric acid and at least one organic compound selected from the group consisting of mercapto-carboxylic acids of a general formula:

HS—(CH$_2$)$_n$—COOR where n represents an integer of from 1 to 3; and R represents a hydrogen atom, or an alkali metal, an alkaline earth metal, an ammonium group, or an alkyl group having from 1 to 10 carbon atoms,
thio-acids of a general formula:

R'—COSH where R' represents a monovalent hydrocarbon group having from 1 to 15 carbon atoms,
amino-substituted mercaptans of a general formula:

H$_2$N—R''—SH where R'' represents a divalent hydrocarbon group having from 1 to 15 carbon atoms,
dimercaptans of a general formula:

HS—R''—SH where R'' represents a divalent hydrocarbon group having from 1 to 15 carbon atoms, and
mercapto-alcohols of a general formula:

R$^a$S—R'''—(OH)$_n$ where R''' represents an alkyl group having from 1 to 15 carbon atoms or a phenyl group; R$^a$ represents a hydrogen atom or an alkyl group having from 1 to 2 carbon atoms; and n represents an integer of from 1 to 2,
and then again dried to prepare said catalyst.

37. A method for preparing a catalyst for hydrotreating hydrocarbons, wherein a carrier substance consisting essentially of an oxide of aluminium and/or an oxide hydrate of aluminium is blended and kneaded with a solution of at least one organic compound selected from the group consisting of mercapto-carboxylic acids of a general formula:

HS—(CH$_2$)$_n$—COOR where n represents an integer of from 1 to 3; and R represents a hydrogen atom, or an alkali metal, an alkaline earth metal, an ammonium group, or an alkyl group having from 1 to 10 carbon atoms,
thio-acids of a general formula:

R'—COSH where R' represents a monovalent hydrocarbon group having from 1 to 15 carbon atoms,
amino-substituted mercaptans of a general formula:

H$_2$N—R''—SH where R'' represents a divalent hydrocarbon group having from 1 to 15 carbon atoms,
dimercaptans of a general formula:

HS—R''—SH where R'' represents a divalent hydrocarbon group having from 1 to 15 carbon atoms, and
mercapto-alcohols of a general formula:

R$^a$S—R'''—(OH)$_n$ where R''' represents an alkyl group having from 1 to 15 carbon atoms or a phenyl group; R$^a$ represents a hydrogen atom or an alkyl group having from 1 to 2 carbon atoms; and n represents an integer of from 1 to 2, the resulting blend is shaped and temporarily dried, and the thus dried, shaped body is impregnated with an aqueous solution comprising at least one compound selected from water-soluble compounds of metals of Group VI and Group VIII of the Periodic Table, and phosphoric acid, and then again dried to prepare said catalyst.

38. A method for preparing a catalyst for hydrotreating hydrocarbons, wherein a carrier substance consisting essentially of an oxide of aluminium and/or an oxide hydrate of aluminium is blended and kneaded with an aqueous solution of phosphoric acid, the resulting blend is shaped and then temporarily dried, and the thus dried, shaped body is impregnated with a solution comprising at least one organic compound selected from water-soluble compounds of metals of Group VI and Group VIII of the Periodic Table and at least one organic compound selected from the group consisting of mercapto-carboxylic acids of a general formula:

$$HS-(CH_2)_n-COOR$$

where n represents an integer of from 1 to 3; and R represents a hydrogen atom, or an alkali metal, an alkaline earth metal, an ammonium group, or an alkyl group having from 1 to 10 carbon atoms,
thio-acids of a general formula:

$$R'-COSH$$

where R' represents a monovalent hydrocarbon group having from 1 to 15 carbon atoms,
amino-substituted mercaptans of a general formula:

$$H_2N-R''-SH$$

where R'' represents a divalent hydrocarbon group having from 1 to 15 carbon atoms,
dimercaptans of a general formula:

$$HS-R''-SH$$

where R'' represents a divalent hydrocarbon group having from 1 to 15 carbon atoms, and
mercapto-alcohols of a general formula:

$$R^aS-R'''-(OH)_n$$

where R''' represents an alkyl group having from 1 to 15 carbon atoms or a phenyl group; $R^a$ represents a hydrogen atom or an alkyl group having from 1 to 2 carbon atoms; and n represents an integer of from 1 to 2,
and then again dried to prepare said catalyst.

39. The method for preparing a catalyst for hydrotreating hydrocarbons as claimed in any one of claims 32 to 38, in which the oxide of aluminium and/or oxide hydrate of aluminium constituting the carrier substance is at least one compound selected from the group consisting of γ-alumina, dehydrated boehmite and spray-dried boehmite.

40. The method for preparing a catalyst for hydrotreating hydrocarbons as claimed in claims 32 to 38, in which the water-soluble compounds of metals of Group VI of the Periodic Table are at least one compound selected from ammonium molybdate and annonium tungstate, and the water-soluble compounds of metals of Group VIII of the Periodic Table are at least one compound selected from cobalt nitrate, cobalt carbonate, nickel nitrate and nickel carbonate; said aqueous solution containing at least one compound selected from said water-soluble compounds.

41. The method for preparing a catalyst for hydrotreating hydrocarbons as claimed in any one of claims 32 to 38, in which the mercapto-carboxylic acids of a general formula:

$$HS-(CH_2)_n-COOR$$

where n represents an integer of from 1 to 3; and R represents a hydrogen atom, or an alkali metal, an alkaline earth metal, an ammonium group, or an alkyl group having from 1 to 10 carbon atoms, are at least one compound selected from mercapto-acetic acid and β-mercapto-propionic acid and alkali metal salts, alkaline earth metal salts and ammonium salts thereof and methyl mercapto-acetate, ethyl 2-mercapto-acetate, 2-ethylhexyl mercapto-acetate and methyl 3-mercaptopropionate.

42. The method for preparing a catalyst for hydrotreating hydrocarbons as claimed in any one of claims 32 to 38, in which the thio-acids of a general formula:

$$R'-COSH$$

where R' represents a monovalent hydrocarbon group having from 1 to 15 carbon atoms, are at least one acid selected from thioacetic acid and thio-benzoic acid.

43. The method for preparing a catalyst for hydrotreating hydrocarbons as claimed in any one of claims 32 to 38, in which the amino-substituted mercaptans of a general formula:

$$H_2N-R''-SH$$

where R'' represents a divalent hydrocarbon group having from 1 to 15 carbon atoms, are at least one compound selected from 2-aminoethanethiol and 4-aminothiophenol.

44. The method for preparing a catalyst for hydrotreating hydrocarbons as claimed in any one of claims 32 to 38, in which the dimercaptans of a general formula:

$$HS-R''-SH$$

where R'' represents a divalent hydrocarbon group having from 1 to 15 carbon atoms, are at least one compound selected from ethanedithiol and 1,4-butandedithiol.

45. The method for preparing a catalyst for hydrotreating hydrocarbons as claimed in any one of claims 32 to 38, in which the mercapto-alcohols of a general formula:

$$R^aS-R'''-(OH)_n$$

where R''' represents an alkyl group having from 1 to 15 carbon atoms or a phenyl group; $R^a$ represents a hydrogen atom or an alkyl group having from 1 to 2 carbon atoms; and n represents an integer of from 1 to 2, are at least one compound selected from 2-mercaptoethanol, 2-(methylthio)ethanol, 2-(ethylthio)ethanol, 3-mercapto-2-butanol, 4-mercaptophenol, 2-(methylthio)phenol, 4-(methylthio)phenol, 3-mercapto-1,2-propanediol,1

3-methylthio-1,2-propanediol and 3-ethylthio-1,2-propanediol.

46. The method for preparing a catalyst for hydrotreating hydrocarbons as claimed in any one of claims 32 to 38, in which the content of the metals of Groups VI and VIII of the Periodic Table in the catalyst is form 1 to 30% by weight as the metal oxide when the ctatlyst contains one metal of one of said Groups, or the content of the metal of Group VI in the catalyst is from 5 to 30% by weight as the metal oxide and that of the metal of Group VIII therein is from 1 to 8 by weight as the metal oxide when the catalyst contains both the metals of Groups VI and VIII.

47. The method for preparing a catalyst for hydrotreating hydrocarbons as claimed in any one of claims 32 to 38, in which the amount of the mercapto-carboxylic acids and other sulfurizing agents is from 1 to 3 equivalent times of the amount of the sulfur necessary for forming sulfides of the metals of Groups VI and VIII of the Periodic Table, said sulfides being high active in hydrogenation reaction.

48. The method for preparing a catalyst for hydrotreating hydrocarbons as claimed in any one of claims 32 to 38, in which the amount of the phosphoric acid is about 3% by weight as $P_2O_5$.

49. The method for preparing a catalyst for hydrotreating hydrocarbons as claimed in any one of claims 32 to 38, in which the drying temperature falls within the range of 50° to 200° C. and the drying time falls within the range of 2 to 20 hours.

* * * * *